US012707484B2

(12) United States Patent
Ryu et al.

(10) Patent No.: US 12,707,484 B2
(45) Date of Patent: Aug. 11, 2026

(54) RESOURCE CONFIGURATION FOR INITIAL BEAM PAIRING FOR SIDELINK OPERATION

(71) Applicant: QUALCOMM Incorporated, San Diego, CA (US)

(72) Inventors: Jae Ho Ryu, San Diego, CA (US); Kazuki Takeda, Minato-ku (JP)

(73) Assignee: QUALCOMM Incorporated, San Diego, CA (US)

(*) Notice: Subject to any disclaimer, the term of this patent is extended or adjusted under 35 U.S.C. 154(b) by 417 days.

(21) Appl. No.: 18/365,898

(22) Filed: Aug. 4, 2023

(65) Prior Publication Data

US 2025/0048402 A1 Feb. 6, 2025

(51) Int. Cl.

*H04W 72/40* (2023.01)
*H04B 7/06* (2006.01)
*H04L 5/00* (2006.01)
*H04W 72/044* (2023.01)
*H04W 92/18* (2009.01)

(52) U.S. Cl.

CPC ......... *H04W 72/40* (2023.01); *H04W 72/046* (2013.01)

(58) Field of Classification Search

CPC ... H04W 72/40; H04W 72/046; H04W 92/18; H04B 7/06954; H04L 5/0053; H04L 5/0023; H04L 5/0048

USPC .......................................................... 370/329

See application file for complete search history.

(56) References Cited

U.S. PATENT DOCUMENTS 8,504,052 B2 8/2013 Hakola et al.
9,474,009 B2 10/2016 Deenoo et al.
2021/0168574 A1* 6/2021 Zhang .................. H04L 5/0048
2022/0110129 A1 4/2022 Huang et al.
2022/0286184 A1* 9/2022 Li ......................... H04B 7/088
2023/0292348 A1* 9/2023 Kim .................... H04W 72/044

(Continued)

FOREIGN PATENT DOCUMENTS

WO WO-2022120674 A1 * 6/2022 ......... H04B 7/06954

OTHER PUBLICATIONS

Lenovo: "Discussion on Enhanced Sidelink Operation on FR2 Licensed Spectrum", 3GPP TSG RAN WG1 #112, R1-2300735, Athens, Greece, Feb. 27, 2023-Mar. 3, 2023, Mar. 3, 2023, pp. 1-5.

(Continued)

*Primary Examiner* — Xuan Lu
(74) *Attorney, Agent, or Firm* — Holland & Hart LLP

(57) ABSTRACT

Methods, systems, and devices for wireless communication are described. A first user equipment (UE) may transmit reference signals bursts during an initial beam pairing (IBP) resource. In some examples, each reference signal burst may include an occasion for transmitting a reference signal of a set of reference signals. A second UE may measure the reference signals during the IBP resource and may determine a beam for sidelink communications with the first UE based on measuring the set of reference signals. The second UE may transmit a response message during a response occasion of the IBP resource, where each response occasion within the IBP resource corresponds to a respective reference signal of the set of reference signals. As such, the second UE may transmit a response message during a response occasion that corresponds to the reference signal associated with the selected beam, thereby indicating the selected beam to the first UE.

30 Claims, 14 Drawing Sheets

(56) References Cited

U.S. PATENT DOCUMENTS

| | | | | |
|---|---|---|---|---|
| 2024/0057043 | A1* | 2/2024 | Fouad | H04L 5/0023 |
| 2024/0340066 | A1* | 10/2024 | Li | H04W 72/40 |
| 2025/0254675 | A1* | 8/2025 | Guo | H04L 5/0091 |

OTHER PUBLICATIONS

Zhao Q (Xiaomi)., et al., "Discussion on SL Beam Management in FR2 Licensed Spectrum", 3GPP TSG RAN WG1 #112, R1-2300579, 3rd Generation Partnership Project, Mobile Competence Centre, 650, Route Des Lucioles, F-06921, Sophia-Antipolis Cedex, France, vol. 3GPP RAN 1, No. Athens, GR, Feb. 27, 2023-Mar. 3, 2023, Feb. 17, 2023, 3 Pages, XP052247724, The Whole Document.

Huawei, et al., "Enhanced Sidelink Operation on Fr2 Licensed Spectrum", 3GPP TSG-RAN WG1 Meeting #113, R1-2304664, 3rd Generation Partnership Project (3GPP), Mobile Competence Centre, 650, Route Des Lucioles, F-06921 Sophia-Antipolis Cedex, France, vol. RAN WG1, No. Incheon, Korea, May 22, 2023-May 26, 2023, May 15, 2023, 26 Pages, XP052385197, Section 2, Figure 1.

International Search Report and Written Opinion—PCT/US2024/037071—ISA/EPO—Oct. 11, 2024.

Qualcomm Incorporated: "Enhanced Sidelink Operation on FR2 Licensed Spectrum", 3GPP TSG RAN WG1 Meeting #113, R1-2305340, Type Discussion, Nr_sl_enh2-core, 3rd Generation Partnership Project, Mobile Competence Centre, 650, Route Des Lucioles, F-06921 Sophia-Antipolis Cedex, France, vol. 3GPP RAN 1, No. Incheon, KR, May 22, 2023-May 26, 2023, May 13, 2023, 27 Pages, XP052310778, Sections 1-2, figure 1.

* cited by examiner

Set of Reference Signals 205

Response Message 210

200

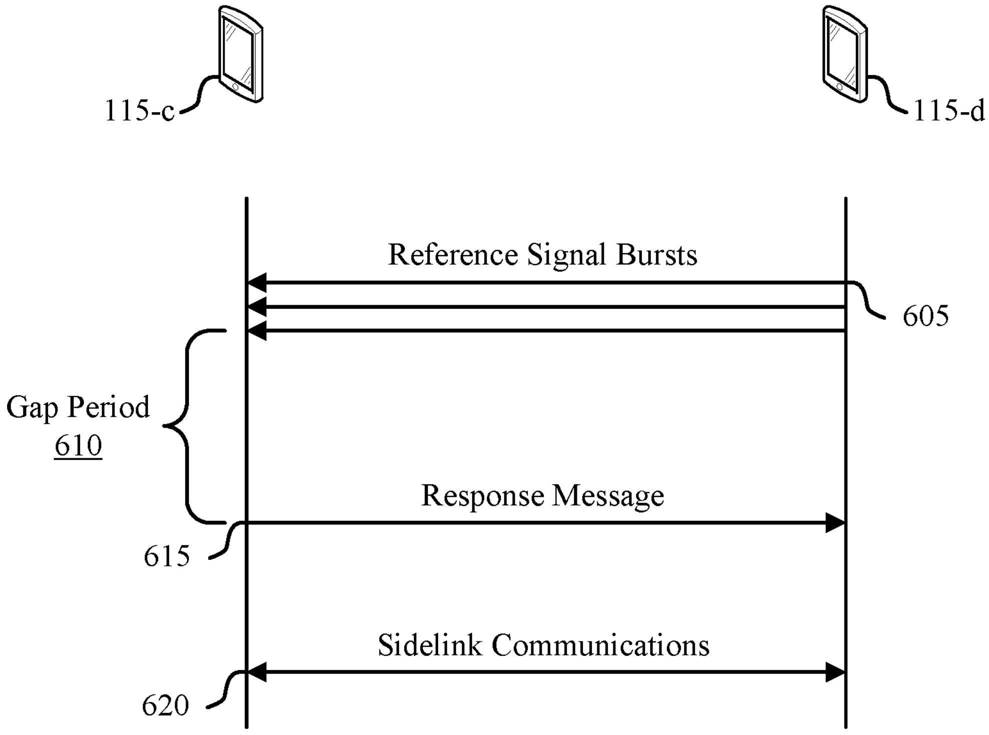
FIG. 6

Figure 11:
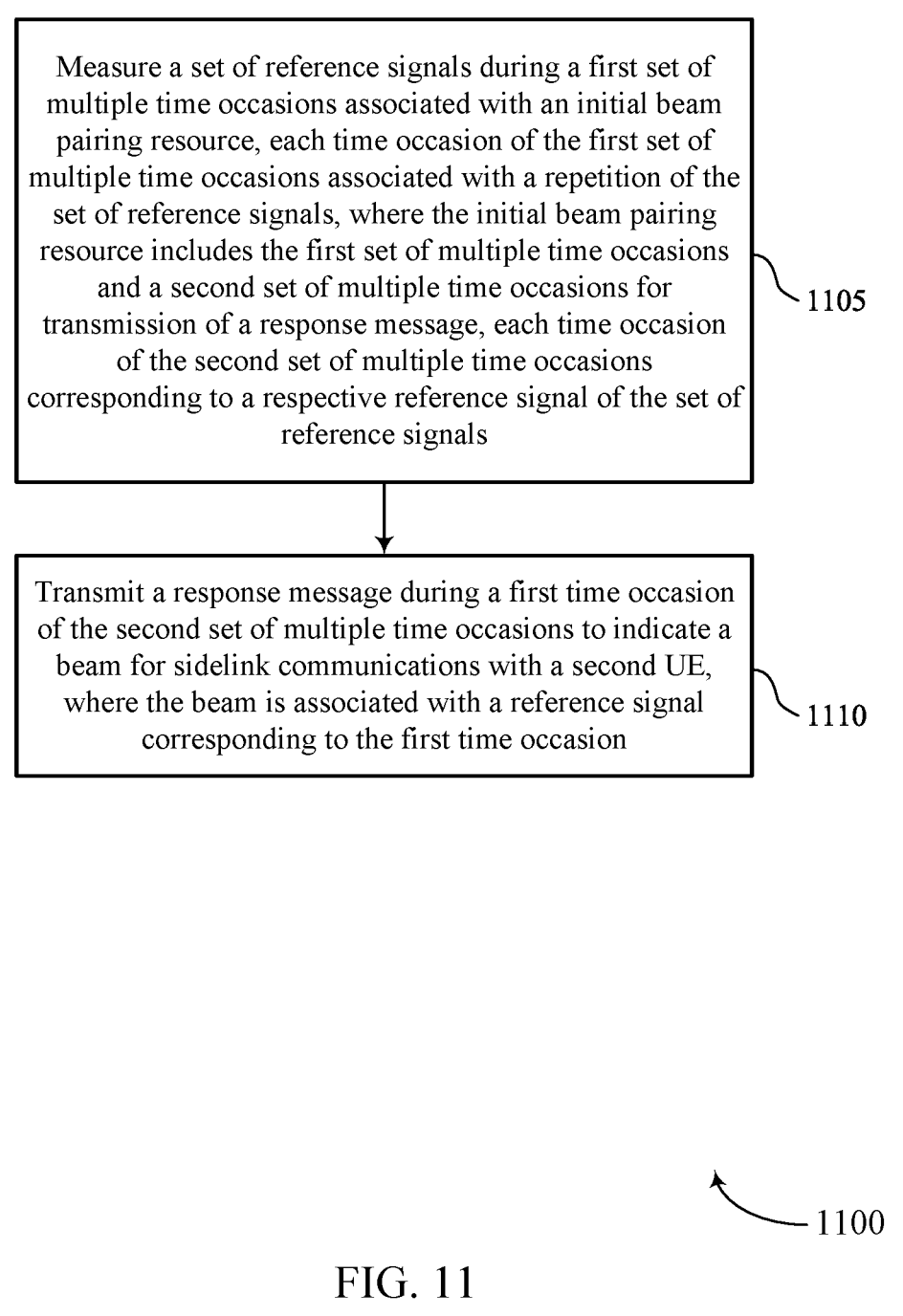

Measure a set of reference signals during a first set of multiple time occasions associated with an initial beam pairing resource, each time occasion of the first set of multiple time occasions associated with a repetition of the set of reference signals, where the initial beam pairing resource includes the first set of multiple time occasions and a second set of multiple time occasions for transmission of a response message, each time occasion of the second set of multiple time occasions corresponding to a respective reference signal of the set of reference signals

1105

Transmit a response message during a first time occasion of the second set of multiple time occasions to indicate a beam for sidelink communications with a second UE, where the beam is associated with a reference signal corresponding to the first time occasion

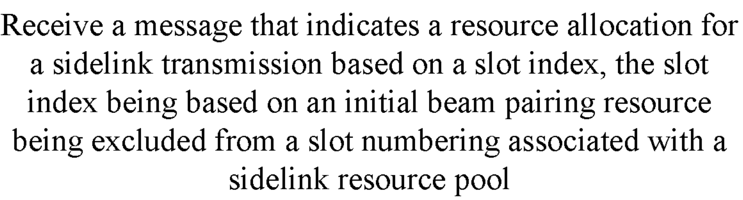

Measure a set of reference signals during a first set of multiple time occasions associated with the initial beam pairing resource, each time occasion of the first set of multiple time occasions associated with a repetition of the set of reference signals, where the initial beam pairing resource includes the first set of multiple time occasions and a second set of multiple time occasions for transmission of a response message, each time occasion of the second set of multiple time occasions corresponding to a respective reference signal of the set of reference signals

1210

Transmit a response message during a first time occasion of the second set of multiple time occasions to indicate a beam for sidelink communications with a second UE, where the beam is associated with a reference signal corresponding to the first time occasion

Figure 13:
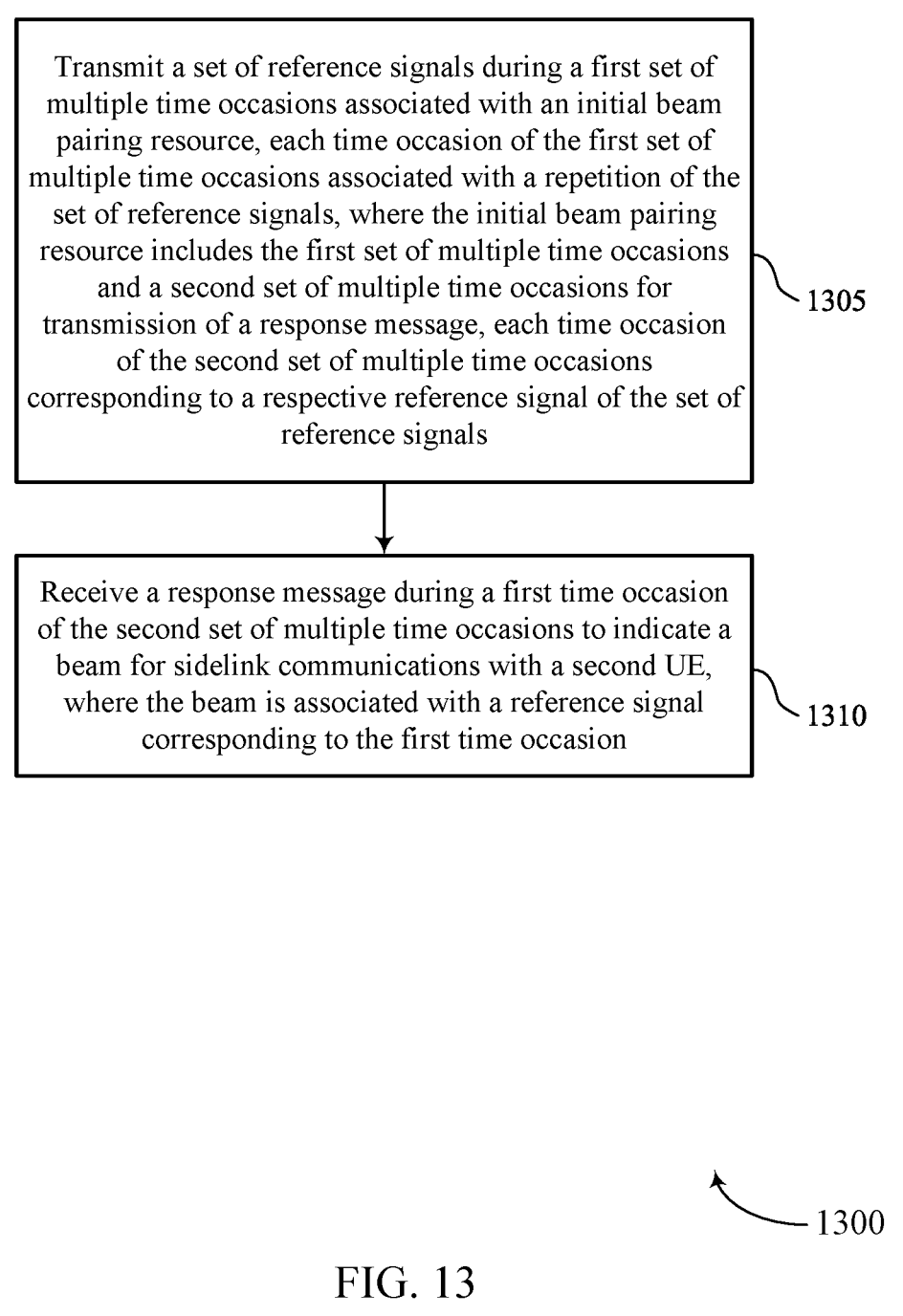

Transmit a set of reference signals during a first set of multiple time occasions associated with an initial beam pairing resource, each time occasion of the first set of multiple time occasions associated with a repetition of the set of reference signals, where the initial beam pairing resource includes the first set of multiple time occasions and a second set of multiple time occasions for transmission of a response message, each time occasion of the second set of multiple time occasions corresponding to a respective reference signal of the set of reference signals

1305

Receive a response message during a first time occasion of the second set of multiple time occasions to indicate a beam for sidelink communications with a second UE, where the beam is associated with a reference signal corresponding to the first time occasion

RESOURCE CONFIGURATION FOR INITIAL BEAM PAIRING FOR SIDELINK OPERATION

FIELD OF TECHNOLOGY

The following relates to wireless communication, including resource configuration for initial beam pairing for sidelink operations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). In some examples, a UE may perform sidelink communications with other UEs.

SUMMARY

The described techniques relate to improved methods, systems, devices, and apparatuses that support resource configuration for initial beam pairing for sidelink operations. For example, the described techniques provide for a first UE to transmit reference signals bursts during an IBP resource. In some examples, each reference signal burst may include an occasion for transmitting a reference signal of a set of reference signals. A second UE may measure the reference signals during the IBP resource. In some examples, the second UE may determine a beam for sidelink communications with the first UE based on measuring the set of reference signals, and the second UE may transmit a response message during a response occasion of the IBP resource. In some examples, each response occasion within the IBP resource may correspond to a respective reference signal of the set of reference signals. As such, the second UE may transmit a response message during a response occasion that corresponds to the reference signal associated with the selected beam, thereby indicating the selected beam to the first UE. In some examples, the IBP resource may include a gap period to provide a time duration for the second UE to switch from receiving operations associated with measuring the set of reference signals to transmitting operations for transmitting the response message.

A method for wireless communication by a first UE is described. The method may include measuring a set of reference signals during a first set of multiple time occasions associated with an IBP resource, each time occasion of the first set of multiple time occasions associated with a repetition of the set of reference signals, where the IBP resource includes the first set of multiple time occasions and a second set of multiple time occasions for transmission of a response message, each time occasion of the second set of multiple time occasions corresponding to a respective reference signal of the set of reference signals and transmitting a response message during a first time occasion of the second set of multiple time occasions to indicate a beam for sidelink communications with a second UE, where the beam is associated with a reference signal corresponding to the first time occasion.

A first UE for wireless communication is described. The first UE may include one or more memories storing processor executable code, and one or more processors coupled with the one or more memories. The one or more processors may individually or collectively operable to execute the code to cause the first UE to measure a set of reference signals during a first set of multiple time occasions associated with an IBP resource, each time occasion of the first set of multiple time occasions associated with a repetition of the set of reference signals, where the IBP resource includes the first set of multiple time occasions and a second set of multiple time occasions for transmission of a response message, each time occasion of the second set of multiple time occasions corresponding to a respective reference signal of the set of reference signals and transmit a response message during a first time occasion of the second set of multiple time occasions to indicate a beam for sidelink communications with a second UE, where the beam is associated with a reference signal corresponding to the first time occasion.

Another first UE for wireless communication is described. The first UE may include means for measuring a set of reference signals during a first set of multiple time occasions associated with an IBP resource, each time occasion of the first set of multiple time occasions associated with a repetition of the set of reference signals, where the IBP resource includes the first set of multiple time occasions and a second set of multiple time occasions for transmission of a response message, each time occasion of the second set of multiple time occasions corresponding to a respective reference signal of the set of reference signals and means for transmitting a response message during a first time occasion of the second set of multiple time occasions to indicate a beam for sidelink communications with a second UE, where the beam is associated with a reference signal corresponding to the first time occasion.

A non-transitory computer-readable medium storing code for wireless communication is described. The code may include instructions executable by a processor to measure a set of reference signals during a first set of multiple time occasions associated with an IBP resource, each time occasion of the first set of multiple time occasions associated with a repetition of the set of reference signals, where the IBP resource includes the first set of multiple time occasions and a second set of multiple time occasions for transmission of a response message, each time occasion of the second set of multiple time occasions corresponding to a respective reference signal of the set of reference signals and transmit a response message during a first time occasion of the second set of multiple time occasions to indicate a beam for sidelink communications with a second UE, where the beam is associated with a reference signal corresponding to the first time occasion.

In some examples of the method, first UEs, and non-transitory computer-readable medium described herein, each reference signal of the set of reference signals may be transmitted in two or less symbol periods.

In some examples of the method, first UEs, and non-transitory computer-readable medium described herein, each reference signal of the set of reference signals may be transmitted in less than two symbol periods.

In some examples of the method, first UEs, and non-transitory computer-readable medium described herein, the IBP resource includes a gap period between a last time occasion of the first set of multiple time occasions and a first time occasion of the second set of multiple time occasions.

In some examples of the method, first UEs, and non-transitory computer-readable medium described herein, a sidelink bandwidth part (BWP) may be associated with a slot numbering and the IBP resource may be configured within a time period determined according to a slot offset applied to the slot numbering associated with the sidelink BWP.

In some examples of the method, first UEs, and non-transitory computer-readable medium described herein, a sidelink resource pool for sidelink communications includes a subset of slots of a sidelink BWP and the IBP resource may be configured within a time period determined according to a slot offset within the sidelink resource pool.

In some examples of the method, first UEs, and non-transitory computer-readable medium described herein, the IBP resource may be excluded from the sidelink resource pool and the method, apparatuses, and non-transitory computer-readable medium may include further operations, features, means, or instructions for receiving a message that indicates a resource allocation for a sidelink transmission based on a slot index, the slot index being based on the IBP resource being excluded from a slot numbering associated with the sidelink resource pool.

In some examples of the method, first UEs, and non-transitory computer-readable medium described herein, the sidelink resource pool for sidelink transmissions includes the IBP resource and the method, apparatuses, and non-transitory computer-readable medium may include further operations, features, means, or instructions for receiving, from the second UE, a sidelink control information message that reserves the IBP resource for a beam pairing procedure.

In some examples of the method, first UEs, and non-transitory computer-readable medium described herein, the IBP resource may be allocated to a first subset of a frequency bandwidth associated with a sidelink BWP or a sidelink resource pool.

In some examples of the method, first UEs, and non-transitory computer-readable medium described herein, a second subset of the frequency bandwidth may be available for sidelink communications by other UEs.

In some examples of the method, first UEs, and non-transitory computer-readable medium described herein, the IBP resource may be selected from a set of multiple frequency division multiplexed resources.

In some examples of the method, first UEs, and non-transitory computer-readable medium described herein, a set of multiple IBP resources including the IBP resource may be associated with a respective comb offset.

In some examples of the method, first UEs, and non-transitory computer-readable medium described herein, the IBP resource and one or more additional beam pairing resources may be partitioned in a sequence domain based on a set of multiple sequence indices of a secondary synchronization signal, a sounding reference signal, or a physical random access channel signal.

In some examples of the method, first UEs, and non-transitory computer-readable medium described herein, the IBP resource and one or more additional beam pairing resources may be partitioned in a cyclic shift domain based on set of multiple cyclic shifts of secondary synchronization signal, sounding reference signal, or physical random access channel signal.

In some examples of the method, first UEs, and non-transitory computer-readable medium described herein, each reference signal of the set of reference signals includes at least one of a secondary synchronization signal, a channel state information reference signal, a sounding reference signal, and a physical random access channel signal.

In some examples of the method, first UEs, and non-transitory computer-readable medium described herein, the response message includes at least one of a secondary synchronization signal, a channel state information reference signal, a sounding reference signal, and a physical random access channel signal, the response message being transmitted using the beam.

In some examples of the method, first UEs, and non-transitory computer-readable medium described herein, the IBP resource repeats based on a first periodicity, the first periodicity being based on a periodicity of a sidelink synchronization signal block.

In some examples of the method, first UEs, and non-transitory computer-readable medium described herein, the IBP resource may be selected for transmission of the set of reference signals based on a mapping between service information and the IBP resource, mapping information between destination information and the IBP resource, an updated identity value for a reference signal of the set of reference signals, or a combination thereof.

A method for wireless communication by a first UE is described. The method may include transmitting a set of reference signals during a first set of multiple time occasions associated with an IBP resource, each time occasion of the first set of multiple time occasions associated with a repetition of the set of reference signals, where the IBP resource includes the first set of multiple time occasions and a second set of multiple time occasions for transmission of a response message, each time occasion of the second set of multiple time occasions corresponding to a respective reference signal of the set of reference signals and receiving a response message during a first time occasion of the second set of multiple time occasions to indicate a beam for sidelink communications with a second UE, where the beam is associated with a reference signal corresponding to the first time occasion.

A first UE for wireless communication is described. The first UE may include one or more memories storing processor executable code, and one or more processors coupled with the one or more memories. The one or more processors may individually or collectively operable to execute the code to cause the first UE to transmit a set of reference signals during a first set of multiple time occasions associated with an IBP resource, each time occasion of the first set of multiple time occasions associated with a repetition of the set of reference signals, where the IBP resource includes the first set of multiple time occasions and a second set of multiple time occasions for transmission of a response message, each time occasion of the second set of multiple time occasions corresponding to a respective reference signal of the set of reference signals and receive a response message during a first time occasion of the second set of multiple time occasions to indicate a beam for sidelink communications with a first UE, where the beam is associated with a reference signal corresponding to the first time occasion.

Another first UE for wireless communication is described. The first UE may include means for transmitting a set of reference signals during a first set of multiple time occasions associated with an IBP resource, each time occasion of the first set of multiple time occasions associated with a repetition of the set of reference signals, where the IBP resource includes the first set of multiple time occasions and a second set of multiple time occasions for transmission of a response message, each time occasion of the second set of multiple time occasions corresponding to a respective reference signal of the set of reference signals and means for receiving a response message during a first time occasion of the second set of multiple time occasions to indicate a beam for sidelink communications with a first UE, where the beam is associated with a reference signal corresponding to the first time occasion.

A non-transitory computer-readable medium storing code for wireless communication is described. The code may include instructions executable by a processor to transmit a set of reference signals during a first set of multiple time occasions associated with an IBP resource, each time occasion of the first set of multiple time occasions associated with a repetition of the set of reference signals, where the IBP resource includes the first set of multiple time occasions and a second set of multiple time occasions for transmission of a response message, each time occasion of the second set of multiple time occasions corresponding to a respective reference signal of the set of reference signals and receive a response message during a first time occasion of the second set of multiple time occasions to indicate a beam for sidelink communications with a first UE, where the beam is associated with a reference signal corresponding to the first time occasion.

In some examples of the method, first UEs, and non-transitory computer-readable medium described herein, each reference signal of the set of reference signals may be transmitted in two or less symbol periods.

In some examples of the method, first UEs, and non-transitory computer-readable medium described herein, the IBP resource includes a gap period between a last time occasion of the first set of multiple time occasions and a first time occasion of the second set of multiple time occasions.

In some examples of the method, first UEs, and non-transitory computer-readable medium described herein, a sidelink BWP may be associated with a slot numbering and the IBP resource may be configured within a time period determined according to a slot offset applied to the slot numbering associated with the sidelink BWP.

In some examples of the method, first UEs, and non-transitory computer-readable medium described herein, a sidelink resource pool for sidelink communications includes a subset of slots of a sidelink BWP and the IBP resource may be configured within a time period determined according to a slot offset within the sidelink resource pool.

In some examples of the method, first UEs, and non-transitory computer-readable medium described herein, the IBP resource may be excluded from the sidelink resource pool for sidelink transmissions and the method, apparatuses, and non-transitory computer-readable medium may include further operations, features, means, or instructions for transmitting a message that indicates a resource allocation for a sidelink transmission based on a slot index, the slot index being based on the IBP resource being excluded from a slot numbering associated with the sidelink resource pool.

In some examples of the method, first UEs, and non-transitory computer-readable medium described herein, the sidelink resource pool for sidelink transmissions includes the IBP resource and the method, apparatuses, and non-transitory computer-readable medium may include further operations, features, means, or instructions for transmitting a sidelink control information message that reserves the IBP resource for a beam pairing procedure.

In some examples of the method, first UEs, and non-transitory computer-readable medium described herein, the IBP resource may be allocated to a first subset of a frequency bandwidth associated with a sidelink BWP or a sidelink resource pool.

In some examples of the method, first UEs, and non-transitory computer-readable medium described herein, each reference signal of the set of reference signals includes at least one of a secondary synchronization signal, a channel state information reference signal, a sounding reference signal, and a physical random access channel signal.

In some examples of the method, first UEs, and non-transitory computer-readable medium described herein, the response message includes a secondary synchronization signal, a channel state information reference signal, a sounding reference signal, or a physical random access channel signal, the response message being received using the beam.

BRIEF DESCRIPTION OF THE DRAWINGS

FIG. 6 shows an example of a process flow that supports resource configuration for initial beam pairing for sidelink operations in accordance with one or more aspects of the present disclosure.

FIGS. 11 through 14 show flowcharts illustrating methods that support resource configuration for initial beam pairing for sidelink operations in accordance with one or more aspects of the present disclosure.

DETAILED DESCRIPTION

Some wireless communications systems may support sidelink communications between a first UE and a second UE. To determine transmit and receive beams for a sidelink transmission, the first UE and the second UE may perform initial beam pairing (IBP) procedures. For example, the first UE may perform beam sweeping (e.g., transmit a set of reference signals), and the second UE may measure each reference signal of the set of reference signals and transmit a response message that indicates one or more beams for the sidelink transmission selected based on measuring the set of reference signals. However, to perform the IBP procedure, the first UE and the second UE identify resources (e.g., time resources, frequency resources) for transmission of the set of reference signals and for transmission of the response message. As such, techniques for configuring these resources between the first UE and the second UE may be desired.

In accordance with examples as described herein, the first UE and the second UE may be configured with an IBP resource. The IBP resource may support a plurality of IBP reference signal bursts, where each reference signal burst includes an occasion for transmission of each reference signal of a set of reference signals. The IBP resource may also include a plurality of response occasions, and each response occasion of the plurality of response occasions may correspond to a reference signal of the set of reference signals. Accordingly, the second UE may select a beam for sidelink communications associated with a reference signal of the set of reference signals, and the second UE may transmit a response message during a response occasion of the plurality of response occasions that corresponds to the reference signal associated with the selected beam. The IBP resource may be configured in a periodic manner, such that the IBP resource repeats with an IBP periodicity. In some examples, the IBP resource may be configured in a sidelink bandwidth part, and the IBP resource may be excluded from a sidelink resource pool used for sidelink transmissions. Alternatively, the IBP resource may be configured within the sidelink resource pool, and resources corresponding to some of the configured IBP resources may be available for sidelink transmissions when the first UE and the second UE are not performing an IBP procedure.

Aspects of the disclosure are initially described in the context of wireless communications systems and resource diagrams. Aspects of the disclosure are additionally illustrated in the context of process flows. Aspects of the disclosure are further illustrated by and described with reference to apparatus diagrams, system diagrams, and flowcharts that relate to resource configuration for initial beam pairing for sidelink operations.

Figure 1:
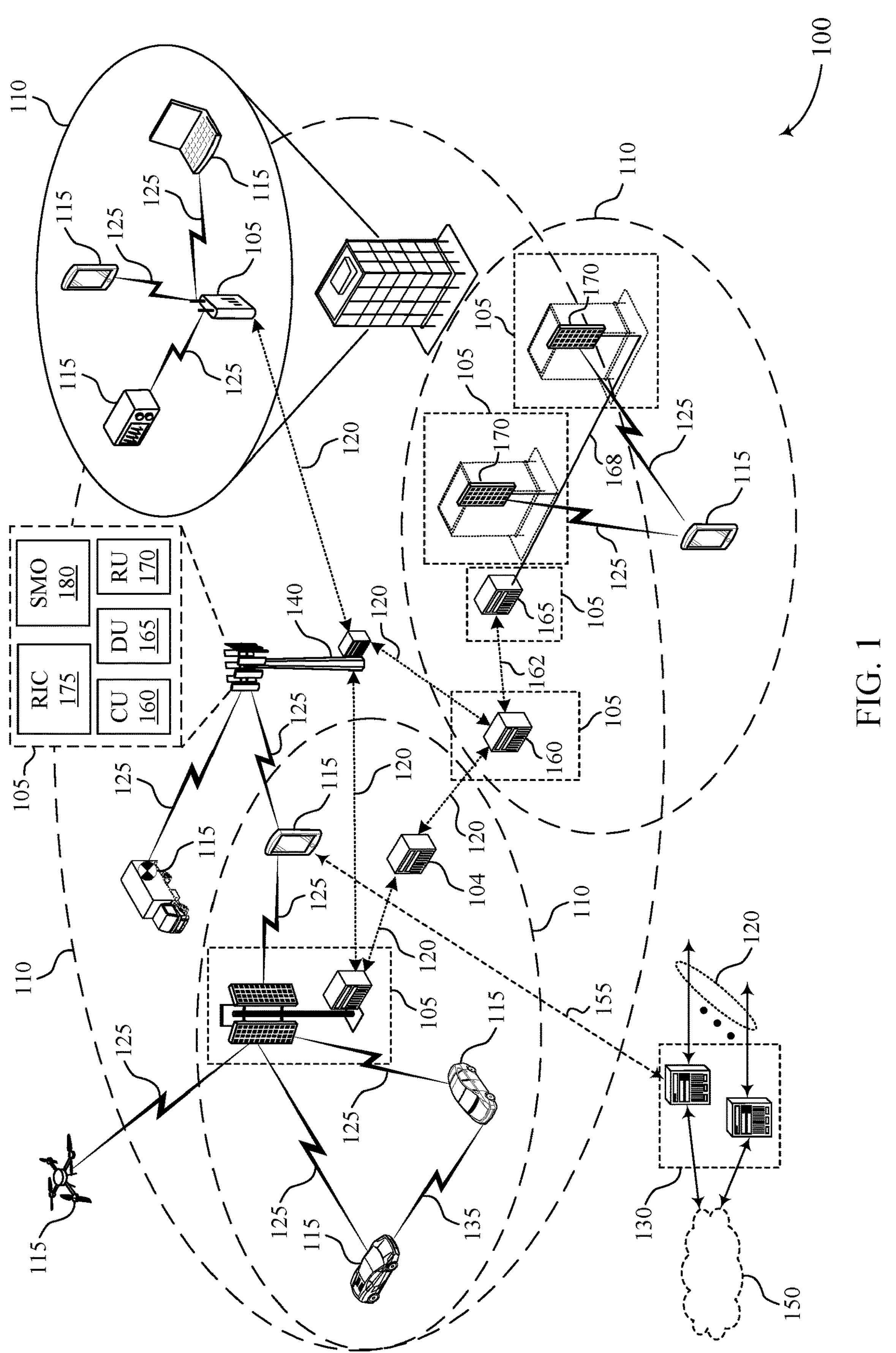
FIG. 1 shows an example of a wireless communications system that supports resource configuration for initial beam pairing for sidelink operations in accordance with one or more aspects of the present disclosure.

FIG. 1 shows an example of a wireless communications system 100 that supports resource configuration for initial beam pairing for sidelink operations in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support resource configuration for initial beam pairing for sidelink operations as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, a network entity 105 may configure a UE 115 with an IBP procedure for communications with the network entity 105. For example, a network entity 105 may transmit a plurality of synchronization signal blocks (SSBs) (e.g., transmitted using beam sweeping) to determine a transmit beam for communications with the UE 115, which may involve transmitting a plurality of reference signals (e.g., reference signals associated with different beams). The UE 115 may measure the SSBs and select a beam (e.g., an SSB) with a highest measured reference signal received power (RSRP) value. In some examples, the UE 115 may decode (e.g., read) a system information block to obtain a serving cell configuration, and the system information block may be transmitted with the same beams used for the SSB beam sweeping. For example, there may be a one-to-one correspondence between an SSB and a control resource set (e.g., CORESET0) for a system information block physical downlink shared channel (PDSCH) scheduling.

By decoding the system information block, the UE 115 may determine a physical random access channel (PRACH) occasion associated with the selected SSB, and the UE 115 may transmit a PRACH message to the network entity 105 to initiate a PRACH procedure. For example, there may be a one-to-one correspondence between an SSB index and a PRACH occasion, and the UE 115 may select the PRACH occasion corresponding to the selected SSB. The network entity 105 may monitor for PRACH messages using a receive beam in each PRACH occasion associated with a transmit beam (e.g., an SSB). As such, the network entity 105 may detect the PRACH message and the network entity 105 and the UE 115 may communicate based on the corresponding transmit and receive beams.

Some wireless communications systems may support sidelink communications between a first UE 115 and a second UE 115. To configure sidelink SSBs (S-SSBs) for the first UE 115, the network entity may indicate one or more slot offsets, which may indicate a position (e.g., occasion, time occasion) for an S-SSB offset from a start of a frame (e.g., a frame with an SFN mod X equal to zero, where X may be equal to sixteen (16)). In some examples, each S-SSB may occupy 11 physical resource blocks (PRBs) in a frequency domain, and the frequency location may be indicated by the network entity. For example, the frequency location may be indicated in a sl-AbsoluteFrequencySSB field, which may be included in a SL-FreqConfig information element. The frequency location may be provided as a center frequency of the S-SSB, and the UE 115 may determine the entire frequency location based on a configured size for S-SSBs (e.g., 11 PRBs). In some cases, the center frequency may be indicated with reference to a point in frequency (e.g., Point A), which may be indicated in a sl-Absolute FrequencyPointA field in the SL-FreqConfig information element.

To determine transmit and receive beams for a sidelink transmission, the first UE 115 and the second UE 115 may perform sidelink IBP procedures. For example, the first UE 115 may perform beam sweeping and transmit a set of reference signals, and the second UE 115 may measure each reference signal of the set of reference signals and transmit a response message that indicates one or more beams for the sidelink transmission selected based on measuring the set of reference signals. However, to perform the IBP procedures, resources (e.g., time resources, frequency resources) may be undefined for transmission of the set of reference signals and for transmission of the response message between the first UE 115 and the second UE 115. As such, techniques for configuring these resources between the first UE 115 and the second UE 115 may be desired.

In accordance with examples as described herein, the first UE 115 and the second UE 115 may be configured with an IBP resource. The IBP resource may support a plurality of IBP reference signal bursts, where each reference signal burst includes an occasion for transmission of each reference signal of a set of reference signals. The IBP resource may also include a plurality of response occasions, and each response occasion of the plurality of response occasions may correspond to a reference signal of the set of reference signals. Accordingly, the second UE 115 may select a beam for sidelink communications associated with a reference signal of the set of reference signals, and the second UE 115 may transmit a response message during a response occasion of the plurality of response occasions that corresponds to the reference signal associated with the selected beam. The IBP resource may be configured in a periodic manner, such that the IBP resource repeats with an IBP periodicity. In some examples, the IBP resource may be configured in a sidelink bandwidth part in resources excluded from a sidelink resource pool used for sidelink transmissions. Alternatively, the IBP resource may be configured within the sidelink resource pool, and resources corresponding to some of the configured IBP resources may be available for sidelink transmissions when the first UE 115 and the second UE 115 are not performing an IBP procedure.

Figure 2:
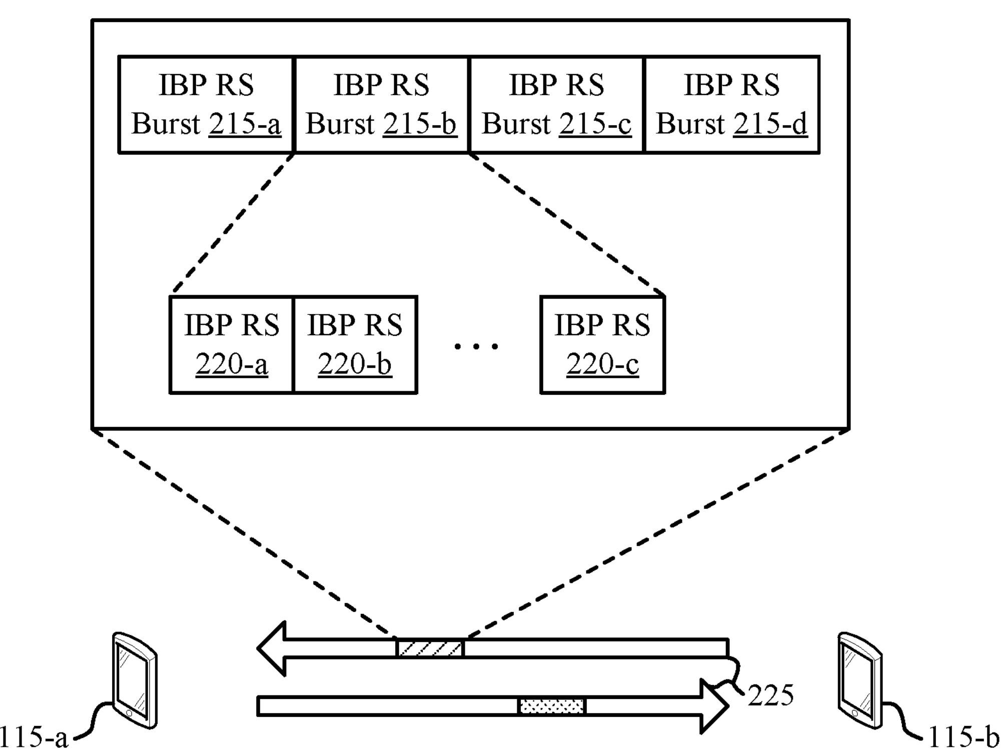
FIG. 2 shows an example of a wireless communications system that supports resource configuration for initial beam pairing for sidelink operations in accordance with one or more aspects of the present disclosure.

FIG. 2 shows an example of a wireless communications system 200 that supports resource configuration for initial beam pairing for sidelink operations in accordance with one or more aspects of the present disclosure. The wireless communications system 200 may include a UE 115-*a* and a UE 115-*b*, which may be examples of UEs 115 as described herein, with reference to FIG. 1. The UE 115-*a* and the UE 115-*b* may communicate via communication links 225 (e.g., sidelink communication links), which may be examples of the communication links 125 as described herein.

To determine transmit and receive beams for sidelink transmissions, the UE 115-*a* and the UE 115-*b* may perform sidelink IBP procedures. For example, the UE 115-*a* may perform beam sweeping (e.g., transmit a set of reference signals each associated with a different beam), and the UE 115-*b* may measure each reference signal of the set of reference signals and transmit a response message that indicates one or more beams for the sidelink transmission selected based on measuring the set of reference signals. However, to perform the IBP procedures, resources (e.g., time resources, frequency resources) may be undefined for transmission of the set of reference signals and for transmission of the response message between the UE 115-*a* and the UE 115-*b*. As such, techniques for configuring these resources between the UE 115-*a* and the UE 115-*b* may be desired.

In accordance with examples as described herein, the UE 115-*a* and the UE 115-*b* may be configured with an IBP resource. In some examples, the IBP resource may be configured in a periodic manner, such that the IBP resource repeats with an IBP periodicity, as described in more detail with reference to FIG. 3. The IBP resource may support a plurality of IBP reference signal bursts 215, where each reference signal burst includes an occasion for transmission of a set of reference signals 205. For example, the UE 115-*b* may transmit the set of reference signals 205 during each of an IBP reference signal (RS) burst 215-*a*, an IBP RS burst 215-*b*, an IBP RS burst 215-*c*, and an IBP RS burst 215-*d*. Each IBP RS burst 215 may have an occasion for transmission of each reference signal of the set of reference signals 205. As such, for each IBP RS burst 215, the UE 115-*b* may transmit one or more IBP RSs 220, such as an IBP RS 220-*a*, an IBP RS 220-*b*, and an IBP RS 220-*c*.

The UE 115-*a* may monitor the IBP RS bursts 215 and measure the set of reference signals 205. In some examples, the UE 115-*a* may use different receive beams for measurement of different IBP RS bursts to determine a beam (e.g., a receive beam) to be used by the UE 115-*a* for sidelink communication between the UE 115-*a* and the UE 115-*b*. Additionally, or alternatively, the UE 115-*a* may determine a beam (e.g., a transmit beam) to be used by the UE 115-*b* for sidelink transmissions between the UE 115-*a* and the UE 115-*b* based on measuring the set of reference signals 205. For instance, the UE 115-*a* may calculate (e.g., measure) a RSRP value associated with each of the reference signals in the set of reference signals 205 and may select one or more beams (e.g., a set of beams including a transmit beam and a receive beam) to be used for sidelink transmissions between the UE 115-*a* and the UE 115-*b* based on a reference signal with a highest calculated RSRP value.

In some examples, the IBP resource may also include a plurality of response occasions, and each response occasion of the plurality of response occasions may correspond to a reference signal of the set of reference signals 205. As such, the UE 115-*a* may transmit a response message 210 during a response occasion of the plurality of response occasions that corresponds to the reference signal associated with the selected beam to be used the by the UE 115-*b* for sidelink transmissions. The UE 115-*b* may monitor during the response occasions, and may detect the response message 210 transmitted by the UE 115-*a*. Accordingly, the UE 115-*b* may determine which beam to use for sidelink transmissions based on during which response occasion the response message 210 was transmitted by the UE 115-*a*.

In some cases, the IBP resource may be configured in a sidelink BWP. For example, the IBP resource may be configured based on a slot offset (e.g., a physical slot offset) relative to a reference frame (e.g., according to a frame index). For instance, a location (e.g., a time occasion) of the IBP resource may be indicated (e.g., in a message) or configured (e.g., by a network entity 105 or preconfigured) to the UE 115-*a*, the UE 115-*b*, or both as a slot offset from a frame with an SFN that is evenly divisible by a predefined or configured number (e.g., SFN modulo 16 is equal to zero). In some examples, the IBP resource configured in the sidelink BWP may be excluded from a sidelink resource pool used for sidelink transmissions. For example, resources allocated to IBP resources may not be available to be used for sidelink transmissions (e.g., data transmissions) between the UE 115-*a* and the UE 115-*b*.

Alternatively, the IBP resource may be configured within the sidelink resource pool, which may be a subset of slots of the sidelink BWP. For example, the IBP resource may be configured based on a slot offset (e.g., a logical slot offset) within the sidelink resource pool relative to a frame (e.g., a frame index). For instance, a location (e.g., a time occasion) of the IBP resource may be indicated (e.g., in a message) or configured (e.g., by a network entity 105 or preconfigured) to the UE 115-*a*, the UE 115-*b*, or both based on a slot numbering of the sidelink resource pool. In some examples, the IBP resource may be configured as a slot offset within a sidelink resource pool from a frame with an SFN that is evenly divisible by a predefined or configured number (e.g., SFN modulo 16 is equal to zero).

In some examples, IBP resources configured in the sidelink resource pool may be unavailable to be used for sidelink transmissions. For example, resources allocated to IBP resources may not be available to be used for sidelink transmissions (e.g., data transmissions) between the UE 115-*a* and the UE 115-*b*. In these cases, resource allocation for sidelink transmissions (e.g., when operating in Mode 2, where scheduling of resources may be performed by the UE 115-*a* and the UE 115-*b*) may be based on slot indices that exclude slots allocated for IBP resources. For example, slot numbering for the sidelink resource pool may exclude slots allocated for IBP resources, such that a slot index for a resource prior to an IBP resource and a slot index for a resource immediately following the IBP resource are continuous. As such, the UE 115-*a* may indicate a resource allocation for a sidelink transmission based on a slot index based on the slot numbering that excludes IBP resources.

Alternatively, the IBP resources may be available for sidelink transmissions between the UE 115-*a* and the UE 115-*b*. For example, slot indices of a sidelink resource pool may include slots allocated for IBP resources. To perform an IBP procedure, the UE 115-*b* (e.g., an initiating UE 115) may reserve the IBP resource, for example, using resource reservation signaling (e.g., sidelink control information (SCI), such as SCI1 signaling). In some examples, a field in SCI may be used which may indicate that a physical sidelink control information channel (PSCCH) message contains resource reservation signaling (e.g., when set to a value of one). In some examples, the IBP resources may be assigned predefined or preconfigured resource selection for resource selection in Mode 2 operations (e.g., a field may be included in a PSCCH message that indicates a resource is to be used for IBP procedures).

Accordingly, the UE 115-*a* and the UE 115-*b* may perform IBP procedures using the configured IBP resource, thereby allowing the UE 115-*a* and the UE 115-*b* to select a beam for sidelink communications.

Figure 3:
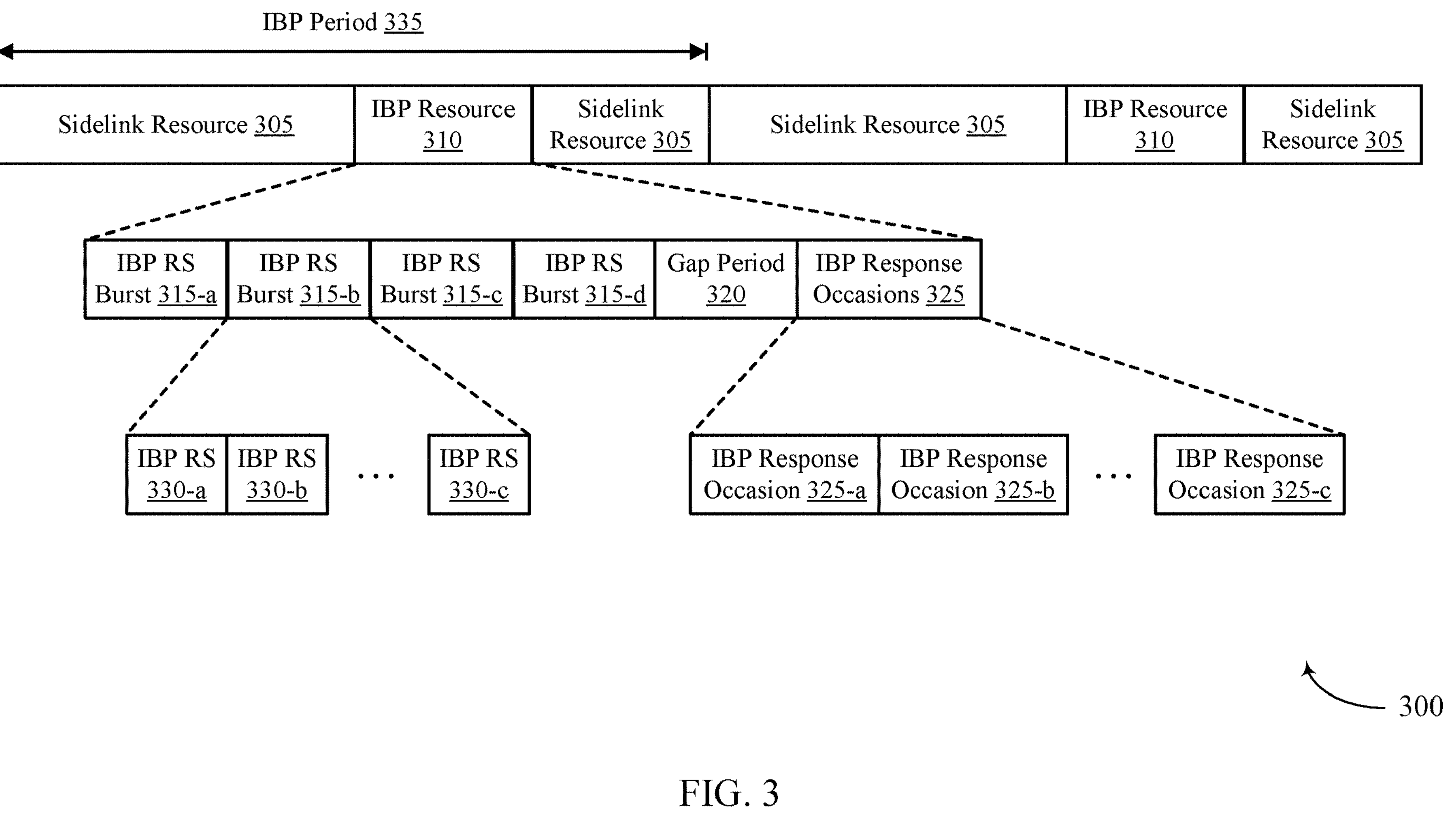
FIGS. 3, 4A, 4B, 5A and 5B show examples of resource diagrams that support resource configuration for initial beam pairing for sidelink operations in accordance with one or more aspects of the present disclosure.

FIG. 3 shows an example of a resource diagram 300 that supports resource configuration for initial beam pairing for sidelink operations in accordance with one or more aspects of the present disclosure. The resource diagram 300 illustrates a potential implementation of an IBP resource 310, as described herein. The resource diagram may illustrate sidelink resources 305, which may be available for sidelink communications between a first UE 115 and a second UE 115.

The IBP resource 310 may support a plurality of IBP RS bursts 315, where each reference signal burst includes an occasion for transmission of a set of reference signals. For example, the IBP resource 310 may include an IBP RS burst 315-*a*, an IBP RS burst 315-*b*, an IBP RS burst 315-*c*, and an IBP RS burst 315-*d*. Each IBP RS burst 315 may include an occasion for transmission of one or more reference signals included in the set of reference signals. For instance, each IBP RS burst 315 may include an occasion for transmission of an IBP RS 330-*a*, an IBP RS 330-*b*, and an IBP RS 330-*c*. As such, the IBP resource 310 may support beam sweeping of a set of reference signals for determining a beam (e.g., a transmit beam, a receive beam, or both) for sidelink transmissions between the first UE 115 and the second UE 115.

In some examples, the IBP resource 310 may include a plurality of IBP response occasions 325. In some cases, each IBP response occasion 325 of the plurality of response occasions may correspond to an IBP RS 330 of the set of reference signals. For example, the IBP response occasion 325-*a* may correspond to the IBP RS 330-*a*, the IBP response occasion 325-*b* may correspond to the IBP RS 330-*b*, and the IBP response occasion 325-*c* may correspond to the IBP RS 330-*c*. As such, the first UE may transmit a response message during an IBP response occasion 325 of the plurality of response occasions that corresponds to the IBP RS 330 associated with the selected beam to be used by the second UE 115 for sidelink transmissions. The second UE 115 may monitor during the response occasions, and may detect the response message transmitted by the first UE 115.

Accordingly, the first UE 115 that receives the set of reference signals during the IBP RS bursts 315 may determine a beam to be used by the second UE 115 for sidelink transmissions, and the first UE 115 may transmit a response message during an IBP response occasion 325 that corresponds to the IBP RS 330 associated with the determined beam. For example, the first UE 115 may select a beam associated with the IBP RS 330-*c* for sidelink transmissions (e.g., based on measurements of the IBP RS 330-*c*, for example, having a highest measured RSRP). The first UE 115 may then transmit a response message during the IBP response occasion 325-*c*. As such, the second UE 115 may determine the selected beam based on the response message being transmitted during the corresponding IBP response occasion.

The IBP RSs 330 may be one or more of a plurality of types of reference signals. For example, each IBP RS 330 may be at least one of a secondary synchronization signal, a channel state information reference signal, a sounding reference signal, and a PRACH signal. Similarly, response messages transmitted during an IBP response occasion 325 may be reference signals, such as a secondary synchronization signal, a channel state information reference signal, a sounding reference signal, and a PRACH signal. In some cases, the response messages may be transmitted using the selected beam for the first UE 115 (e.g., a receive beam corresponding to the transmit beam for the second UE 115).

In some examples, each occasion for transmission of each IBP RS 330 may be one or more symbol periods (e.g., symbols). For example, each occasion for transmission of an IBP RS 330 may be less than a quantity of symbols in a slot. In some cases, each IBP RS occasion may be two or fewer symbol periods (e.g., two symbol periods, one symbol period). Similarly, each IBP response occasion 325 may be one or more symbol periods, and in some cases may be two or less symbol periods (e.g., two symbol periods, one symbol period). In some examples, each IBP response occasion 325 and each occasion for IBP RS 330 transmission may be a same length. Additionally, or alternatively, each IBP response occasion 325 may include an automatic gain control (AGC) symbol for level control in a receiving UE 115.

In some examples, the IBP resource 310 may include a gap period 320. For example, the IBP resource 310 may include the gap period 320 between a last IBP RS burst 315 and a first IBP response occasion 325. The gap period 320 may be configured based on a turn-around time for the first UE 115 between measuring reference signals and transmitting response signals. As such, the gap period 320 may provide enough time for a UE 115 to switch between receiving a last IBP RS 330 and transmitting a response message during a first IBP response occasion 325.

In some examples, the IBP resource 310 may be configured to repeat (e.g., in time) based on an IBP period 335. For example, each IBP period 335 may include an IBP resource 310, which may be configured based on a slot offset from a reference frame (e.g., a frame with an SFN modulo 16 equal to zero), as described herein with reference to FIG. 2. In some examples, the IBP resource 310 may repeat with an IBP periodicity (e.g., corresponding to a length of the IBP period 335). In some cases, the IBP periodicity may be based on an S-SSB periodicity, and the IBP periodicity may be a multiple of (e.g., or the same as) an S-SSB periodicity (e.g., 160 milliseconds).

Figure 4A:
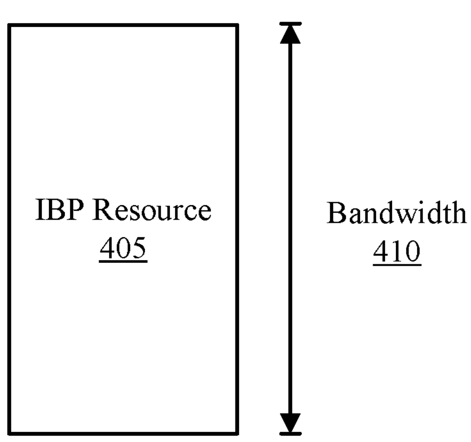
Figure 4B:
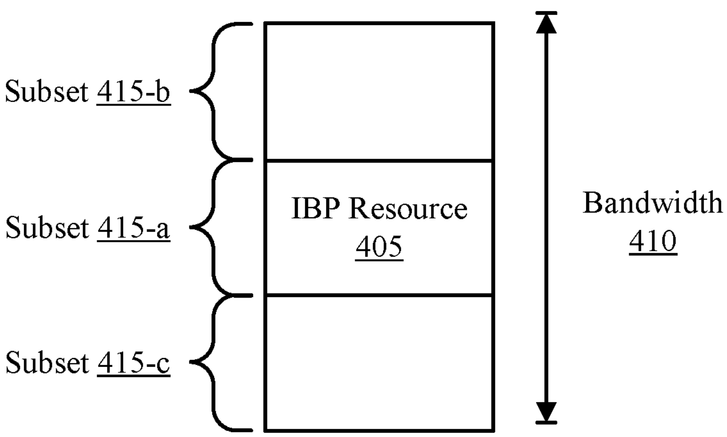

FIGS. 4A and 4B show an example of a resource diagram 400-*a* and a resource diagram 400-*b* that support resource configuration for initial beam pairing for sidelink operations in accordance with one or more aspects of the present disclosure. The resource diagram 400-*a* and the resource diagram 400-*b* show example frequency allocations for an IBP resource 405, which may be an example of IBP resources as described herein, with reference to FIGS. 1 through 3.

The resource diagram 400-*a* shows an example in which the IBP resource 405 is allocated to an entire bandwidth 410. The bandwidth 410 may correspond to a frequency bandwidth allocated to a sidelink BWP or a sidelink resource pool. Accordingly, the IBP resource 405 may be configured such that the IBP resource 405 spans the entire bandwidth 410 of the sidelink BWP or the sidelink resource pool configured to a UE 115. In some examples, the IBP resource 405 may be allocated to the entire bandwidth 410 if IBP reference signals to be transmitted within IBP reference signal burst occasions of the IBP resource 405 are channel state information reference signals or sounding reference signals, which may span the entire bandwidth 410.

The resource diagram 400-*b* shows an example in which the IBP resource 405 is allocated to a subset 415 of the bandwidth 410. For example, the IBP resource 405 may be allocated to a contiguous subset 415-*a* of the bandwidth 410, as illustrated. In these cases, sidelink transmissions may be performed on other portions of the bandwidth 410. For example, a subset 415-*b* and a subset 415-*c* may still be used for sidelink transmissions between UEs 115, and the subset 415-*b* and the subset 415-*c* may be allocated by a network entity 105 or reserved by a UE 115 for a sidelink transmission. In some examples, the IBP resource 405 may be allocated to a subset 415 of the bandwidth 410 if IBP reference signals to be transmitted within IBP reference signal burst occasions of the IBP resource 405 are secondary synchronization signals or PRACH signals.

Figure 5A:
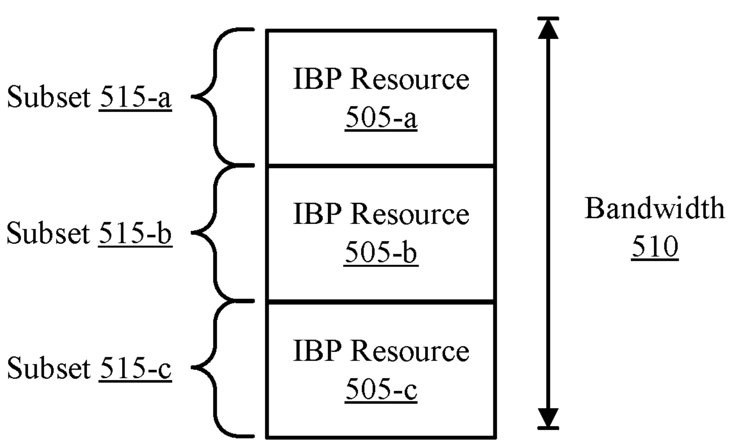
Figure 5B:
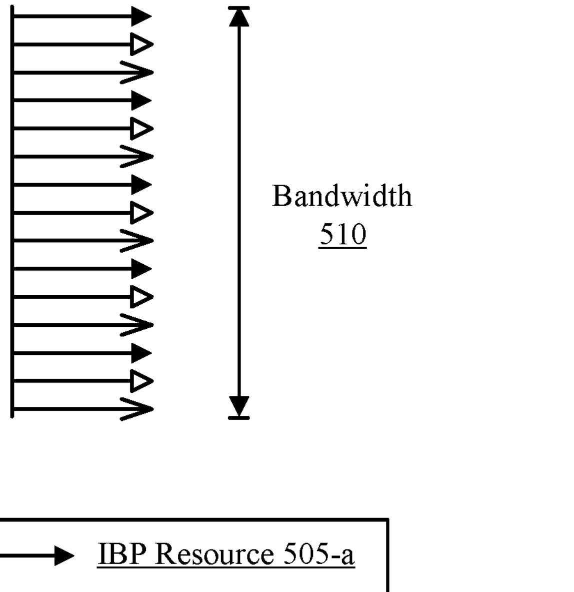

FIGS. 5A and 5B show an example of a resource diagram 500-*a* and a resource diagram 500-*b* that support resource configuration for initial beam pairing for sidelink operations in accordance with one or more aspects of the present disclosure. The resource diagram 500-*a* and the resource diagram 500-*b* show example frequency allocations for an IBP resource 505, which may be an example of IBP resources as described herein, with reference to FIGS. 1 through 4B.

The resource diagram 500-*a* and the resource diagram 500-*b* show examples in which multiple IBP resources 505 are allocated in a bandwidth 510, which may correspond to a frequency bandwidth allocated to a sidelink BWP or a sidelink resource pool. For example, an IBP resource 505-*a*, an IBP resource 505-*b*, and an IBP resource 505-*c* may all be configured within the bandwidth 510 during a same time occasion. By allocating multiple IBP resources 505 within a bandwidth 510 during the same time occasion, multiple IBP procedure may occur during the same time occasion. For example, multiple UEs 115 may be configured to perform IBP procedures during the same time occasion. Additionally, or alternatively, a single UE 115 may be configured to perform multiple IBP procedures (e.g., with other different UEs 115) during the same time occasion.

The resource diagram 500-*a* illustrates an example in which each IBP resource is allocated a contiguous subset 515 of the bandwidth 510, for example, using FDM techniques. In some examples, the IBP resource 505-*a* may be allocated to a subset 515-*a*, the IBP resource 505-*b* may be allocated to a subset 515-*b*, and the IBP resource 505-*c* may be allocated to a subset 515-*c*. In some cases, each IBP resource 505 may be allocated to a subset 515 of the bandwidth 510 if IBP reference signals to be transmitted within IBP reference signal burst occasions of each IBP resource 505 are secondary synchronization signals or PRACH signals.

The resource diagram 500-*b* illustrates an example in which each IBP resource 505 is allocated to the bandwidth 510 based on a comb offset. For example, each of the IBP resource 505-*a*, the IBP resource 505-*b*, and the IBP resource 505-*c* may be associated with a respective comb offset. A UE 115 receiving or transmitting during the IBP resource 505-*a* may determine frequency resources of the bandwidth 510 based on the comb offset that corresponds to the IBP resource 505-*a*. This may result in each IBP resource 505 being allocated to non-contiguous frequency subsets of the bandwidth 510. In some cases, each IBP resource 505 may be allocated to a non-contiguous subset of the bandwidth 510 if IBP reference signals to be transmitted within IBP reference signal burst occasions of each IBP resource 505 are channel state information reference signals or sounding reference signals, which may be associated with a comb size greater than one (e.g., a greater than one reference signal allocated in frequency during the same time occasion).

In some examples, IBP resources 505 that overlap in a time occasion within the bandwidth 510 may be partitioned based on sequence domain partitioning or code domain partitioning. For example, the IBP resources 505 may be partitioned in a sequence domain based on one or more sequence indices of reference signals transmitted during the IBP resources 505, such as sequence indices of secondary synchronization signals, sounding reference signals, or PRACH signals. Additionally, or alternatively, the IBP resources 505 may be partitioned in a cyclic shift domain based on one or more cyclic shifts of reference signals transmitted during the IBP resources 505, such as a cyclic shifts of secondary synchronization signals, sounding reference signals, or PRACH signals.

When a plurality of IBP resources 505 are configured during a same time occasion in the bandwidth 510, a UE 115 initiating an IBP procedure may select an IBP resource 505 for the IBP procedure. In some examples, an initiating UE 115 may randomly select an IBP resource 505 from the plurality of IBP resources 505. A receiving UE 115 may monitor all of the plurality of IBP resources 505 within the bandwidth 510, and the receiving UE 115 may therefore detect that the initiating UE 115 began an IBP procedure.

Alternatively, the initiating UE 115 may select an IBP resource 505 from the plurality of IBP resources 505 based on a mapping (e.g., a mapping rule) between service information (e.g., a unicast service identification (ID), a Proximity Service (ProSe) application ID) and the IBP resource 505, a mapping between destination information (e.g., a destination ID, a User Info ID, a ProSe discovery UE ID) and the IBP resource 505, an updated ID for an IBP reference signal, or any combination thereof. In these cases, the receiving UE 115 may monitor IBP resources associated with corresponding service information (e.g., unicast service), corresponding destination information, or with a new ID for a corresponding IBP reference signal.

In some examples, even in the case of multiple IBP resources 505 during a same time occasion within the bandwidth 510, the IBP resources 505 may be configured such that there may be a one-to-one mapping between an IBP reference signal within an IBP resource 505 and an IBP response occasion within the IBP resource 505 (e.g., one IBP response occasion per IBP reference signal). This may avoid the initiating UE 115 performing blind detection of a response message during a plurality of IBP response occasions for each IBP reference signal.

Accordingly, multiple IBP resources 505 may be allocated to the bandwidth 510 during a same time occasion, thereby allowing for concurrent IBP procedures by one or more UEs 115.

FIG. 6 shows an example of a process flow 600 that supports resource configuration for initial beam pairing for sidelink operations in accordance with one or more aspects of the present disclosure. The process flow 600 may illustrate communications between a UE 115-*c* (e.g., a receiving UE 115) and a UE 115-*d* (e.g., an initiating UE 115), which may be examples of UEs 115 as described herein. The steps described during the process flow 600 may be performed in a different order than as illustrated in FIG. 6. Additionally, or alternatively, some steps may be added to the process flow 600, and some steps may be omitted.

At 605, the UE 115-*d* may transmit reference signals bursts during an IBP resource. In some examples, each reference signal burst may include an occasion for transmitting a reference signal of a set of reference signals. As such, for each reference signal burst, the UE 115-*d* may transmit one or more reference signals of the set of reference signals. The UE 115-*c* may measure the reference signals during the IBP resource. In some examples, the UE 115-*c* may try (e.g., measure using) different receive beams to measure different reference signal bursts to determine a receive beam to be used by the UE 115-*c* for sidelink communication with the UE 115-*d*. Additionally, or alternatively, the UE 115-*c* may determine a transmit beam to be used by the UE 115-*d* for sidelink communications with the UE 115-*c* based on measuring the set of reference signals within the reference signal burst. For example, the UE 115-*c* may determine a beam based on a reference signal having a highest measured value, such as an RSRP value.

At 615, the UE 115-*c* may transmit a response message during a response occasion of the IBP resource. In some examples, each response occasion within the IBP resource may correspond to a respective reference signal of the set of reference signals. As such, the UE 115-*c* may transmit a response message during a response occasion that corresponds to the reference signal associated with the selected beam, thereby indicating the selected beam to the UE 115-*d*. In some cases, the IBP resource may include a gap period 610, which may provide a time duration for the UE 115-*c* to switch from receiving operations associated with measuring the set of reference signals to transmitting operations for transmitting the response message.

At 620, the UE 115-*c* and the UE 115-*d* may perform sidelink communications according to the selected beam. As such, the IBP procedure may facilitate sidelink communications by the UE 115-*c* and the UE 115-*d*.

Figure 7:
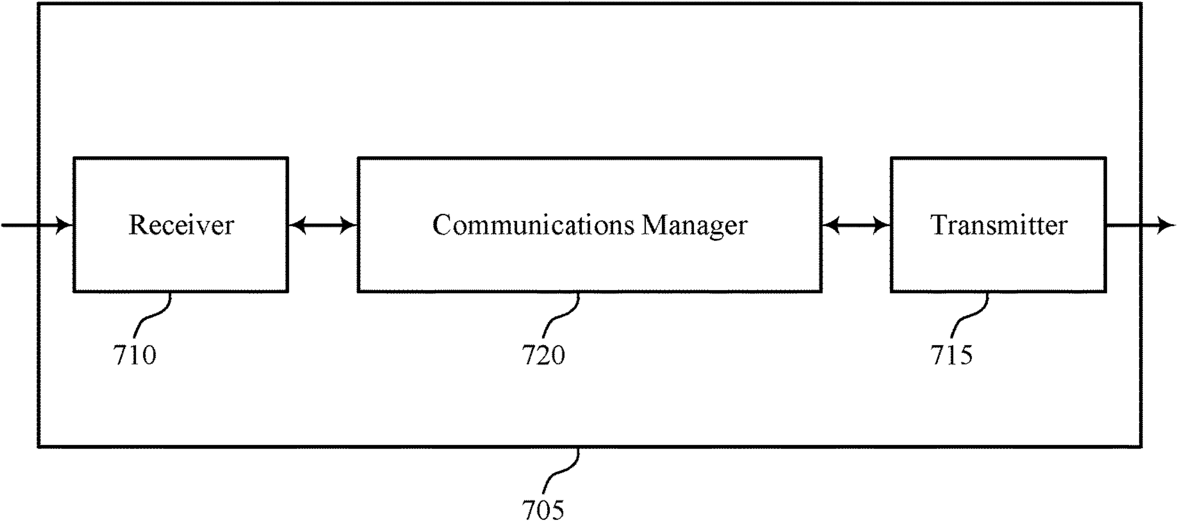
FIGS. 7 and 8 show block diagrams of devices that support resource configuration for initial beam pairing for sidelink operations in accordance with one or more aspects of the present disclosure.

FIG. 7 shows a block diagram 700 of a device 705 that supports resource configuration for initial beam pairing for sidelink operations in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to resource configuration for initial beam pairing for sidelink operations). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to resource configuration for initial beam pairing for sidelink operations). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of resource configuration for initial beam pairing for sidelink operations as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication in accordance with examples as disclosed herein. For example, the communications manager 720 is capable of, configured to, or operable to support a means for measuring a set of reference signals during a first set of multiple time occasions associated with an initial beam pairing resource, each time occasion of the first set of multiple time occasions associated with a repetition of the set of reference signals, where the initial beam pairing resource includes the first set of multiple time occasions and a second set of multiple time occasions for transmission of a response message, each time occasion of the second set of multiple time occasions corresponding to a respective reference signal of the set of reference signals. The communications manager 720 is capable of, configured to, or operable to support a means for transmitting a response message during a first time occasion of the second set of multiple time occasions to indicate a beam for sidelink communications with a second UE, where the beam is associated with a reference signal corresponding to the first time occasion.

Additionally, or alternatively, the communications manager 720 may support wireless communication in accordance with examples as disclosed herein. For example, the communications manager 720 is capable of, configured to, or operable to support a means for transmitting a set of reference signals during a first set of multiple time occasions associated with an initial beam pairing resource, each time occasion of the first set of multiple time occasions associated with a repetition of the set of reference signals, where the initial beam pairing resource includes the first set of multiple time occasions and a second set of multiple time occasions for transmission of a response message, each time occasion of the second set of multiple time occasions corresponding to a respective reference signal of the set of reference signals. The communications manager 720 is capable of, configured to, or operable to support a means for receiving a response message during a first time occasion of the second set of multiple time occasions to indicate a beam for sidelink communications with a second UE, where the beam is associated with a reference signal corresponding to the first time occasion.

By including or configuring the communications manager 720 in accordance with examples as described herein, the device 705 (e.g., at least one processor controlling or otherwise coupled with the receiver 710, the transmitter 715, the communications manager 720, or a combination thereof)

may support techniques for performing IBP procedures with reduced processing, overhead, and more efficient utilization of communication resources.

Figure 8:
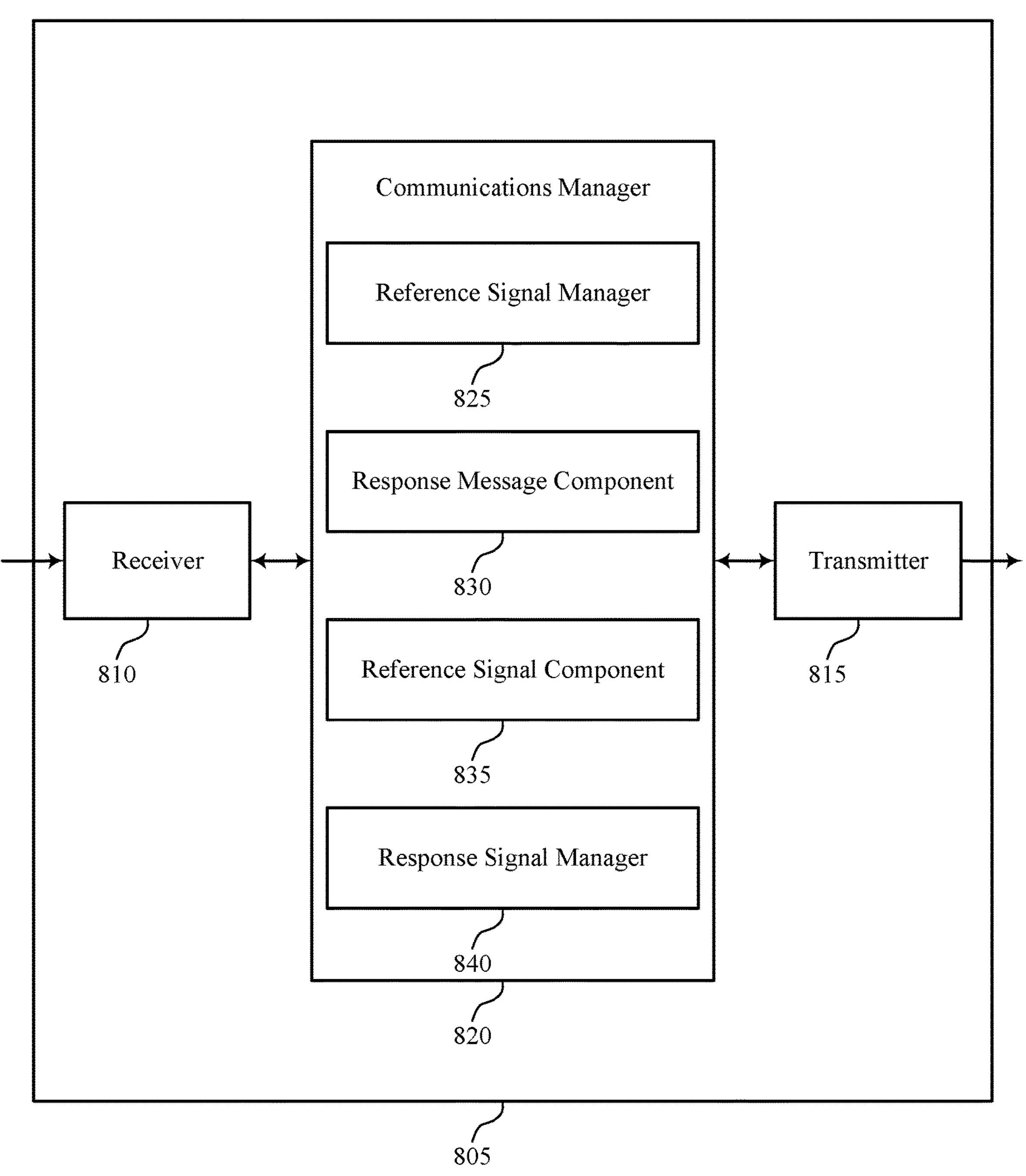

FIG. 8 shows a block diagram 800 of a device 805 that supports resource configuration for initial beam pairing for sidelink operations in accordance with one or more aspects of the present disclosure. The device 805 may be an example of aspects of a device 705 or a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to resource configuration for initial beam pairing for sidelink operations). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to resource configuration for initial beam pairing for sidelink operations). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of resource configuration for initial beam pairing for sidelink operations as described herein. For example, the communications manager 820 may include a reference signal manager 825, a response message component 830, a reference signal component 835, a response signal manager 840, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication in accordance with examples as disclosed herein. The reference signal manager 825 is capable of, configured to, or operable to support a means for measuring a set of reference signals during a first set of multiple time occasions associated with an initial beam pairing resource, each time occasion of the first set of multiple time occasions associated with a repetition of the set of reference signals, where the initial beam pairing resource includes the first set of multiple time occasions and a second set of multiple time occasions for transmission of a response message, each time occasion of the second set of multiple time occasions corresponding to a respective reference signal of the set of reference signals. The response message component 830 is capable of, configured to, or operable to support a means for transmitting a response message during a first time occasion of the second set of multiple time occasions to indicate a beam for sidelink communications with a second UE, where the beam is associated with a reference signal corresponding to the first time occasion.

Additionally, or alternatively, the communications manager 820 may support wireless communication in accordance with examples as disclosed herein. The reference signal component 835 is capable of, configured to, or operable to support a means for transmitting a set of reference signals during a first set of multiple time occasions associated with an initial beam pairing resource, each time occasion of the first set of multiple time occasions associated with a repetition of the set of reference signals, where the initial beam pairing resource includes the first set of multiple time occasions and a second set of multiple time occasions for transmission of a response message, each time occasion of the second set of multiple time occasions corresponding to a respective reference signal of the set of reference signals. The response signal manager 840 is capable of, configured to, or operable to support a means for receiving a response message during a first time occasion of the second set of multiple time occasions to indicate a beam for sidelink communications with a second UE, where the beam is associated with a reference signal corresponding to the first time occasion.

Figure 9:
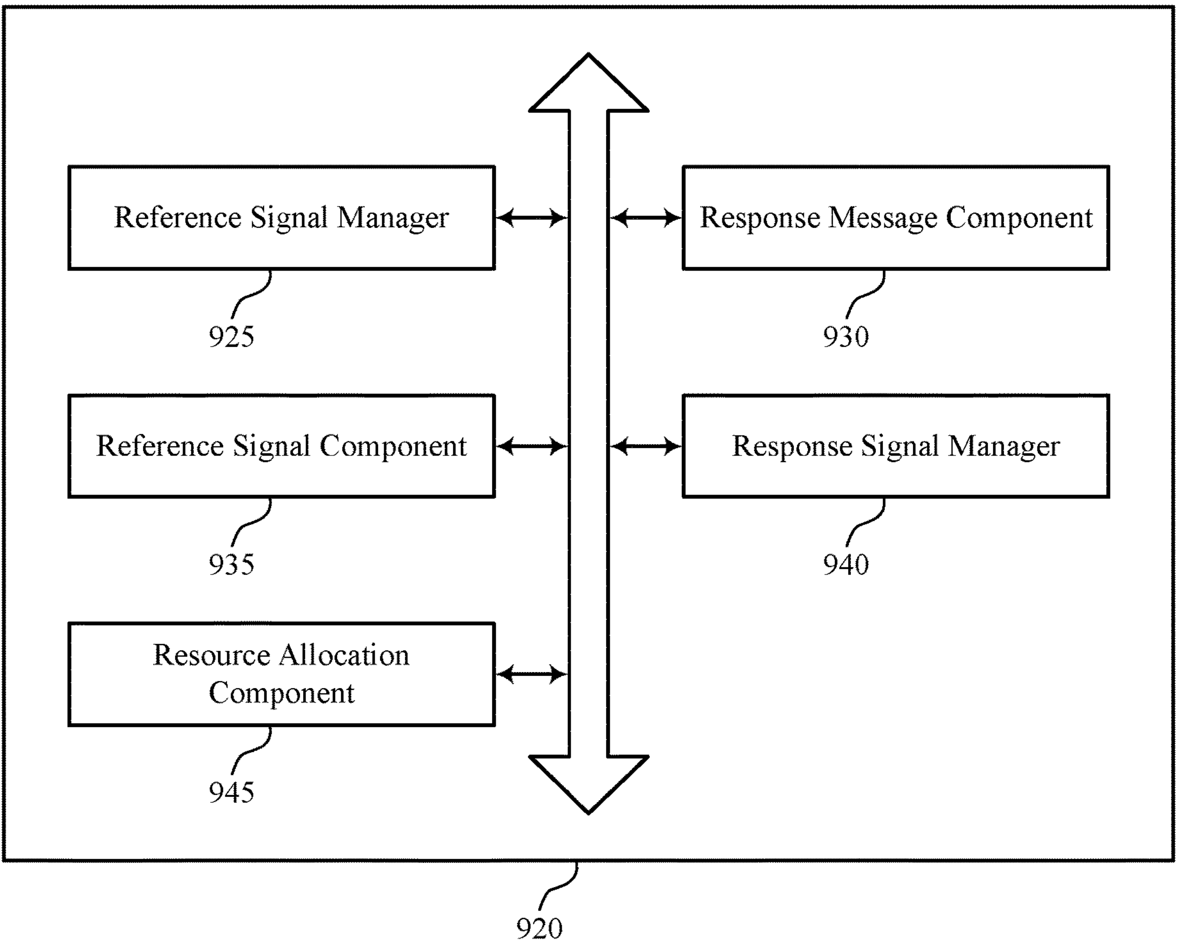
FIG. 9 shows a block diagram of a communications manager that supports resource configuration for initial beam pairing for sidelink operations in accordance with one or more aspects of the present disclosure.

FIG. 9 shows a block diagram 900 of a communications manager 920 that supports resource configuration for initial beam pairing for sidelink operations in accordance with one or more aspects of the present disclosure. The communications manager 920 may be an example of aspects of a communications manager 720, a communications manager 820, or both, as described herein. The communications manager 920, or various components thereof, may be an example of means for performing various aspects of resource configuration for initial beam pairing for sidelink operations as described herein. For example, the communications manager 920 may include a reference signal manager 925, a response message component 930, a reference signal component 935, a response signal manager 940, a resource allocation component 945, or any combination thereof. Each of these components, or components or subcomponents thereof (e.g., one or more processors, one or more memories), may communicate, directly or indirectly, with one another (e.g., via one or more buses).

The communications manager 920 may support wireless communication in accordance with examples as disclosed herein. The reference signal manager 925 is capable of, configured to, or operable to support a means for measuring a set of reference signals during a first set of multiple time occasions associated with an initial beam pairing resource, each time occasion of the first set of multiple time occasions associated with a repetition of the set of reference signals, where the initial beam pairing resource includes the first set of multiple time occasions and a second set of multiple time occasions for transmission of a response message, each time occasion of the second set of multiple time occasions corresponding to a respective reference signal of the set of reference signals. The response message component 930 is capable of, configured to, or operable to support a means for transmitting a response message during a first time occasion of the second set of multiple time occasions to indicate a beam for sidelink communications with a second UE, where the beam is associated with a reference signal corresponding to the first time occasion.

In some examples, each reference signal of the set of reference signals is transmitted in two or less symbol periods. In some examples, each reference signal of the set of reference signals is transmitted in less than two symbol periods. In some examples, the initial beam pairing resource includes a gap period between a last time occasion of the first set of multiple time occasions and a first time occasion of the second set of multiple time occasions.

In some examples, a sidelink bandwidth part is associated with a slot numbering. In some examples, the initial beam pairing resource is configured within a time period determined according to a slot offset applied to the slot numbering associated with the sidelink bandwidth part.

In some examples, a sidelink resource pool for sidelink communications includes a subset of slots of a sidelink bandwidth part. In some examples, the initial beam pairing resource is configured within a time period determined according to a slot offset within the sidelink resource pool.

In some examples, the initial beam pairing resource is excluded from the sidelink resource pool, and the resource allocation component 945 is capable of, configured to, or operable to support a means for receiving a message that indicates a resource allocation for a sidelink transmission based on a slot index, the slot index being based on the initial beam pairing resource being excluded from a slot numbering associated with the sidelink resource pool.

In some examples, the sidelink resource pool for sidelink transmissions includes the initial beam pairing resource, and the resource allocation component 945 is capable of, configured to, or operable to support a means for receiving, from the second UE, a sidelink control information message that reserves the initial beam pairing resource for a beam pairing procedure.

In some examples, the initial beam pairing resource is allocated to a first subset of a frequency bandwidth associated with a sidelink bandwidth part or a sidelink resource pool. In some examples, a second subset of the frequency bandwidth is available for sidelink communications by other UEs. In some examples, the initial beam pairing resource is selected from a set of multiple frequency division multiplexed resources.

In some examples, a set of multiple initial beam pairing resources including the initial beam pairing resource are associated with a respective comb offset. In some examples, the initial beam pairing resource and one or more additional beam pairing resources are partitioned in a sequence domain based on a set of multiple sequence indices of a secondary synchronization signal, a sounding reference signal, or a physical random access channel signal.

In some examples, the initial beam pairing resource and one or more additional beam pairing resources are partitioned in a cyclic shift domain based on set of multiple cyclic shifts of secondary synchronization signal, sounding reference signal, or physical random access channel signal.

In some examples, each reference signal of the set of reference signals includes at least one of a secondary synchronization signal, a channel state information reference signal, a sounding reference signal, and a physical random access channel signal.

In some examples, the response message includes at least one of a secondary synchronization signal, a channel state information reference signal, a sounding reference signal, and a physical random access channel signal, the response message being transmitted using the beam.

In some examples, the initial beam pairing resource repeats based on a first periodicity, the first periodicity being based on a periodicity of a sidelink synchronization signal block.

In some examples, the initial beam pairing resource is selected for transmission of the set of reference signals based on a mapping between service information and the initial beam pairing resource, mapping information between destination information and the initial beam pairing resource, an updated identity value for a reference signal of the set of reference signals, or a combination thereof.

Additionally, or alternatively, the communications manager 920 may support wireless communication in accordance with examples as disclosed herein. The reference signal component 935 is capable of, configured to, or operable to support a means for transmitting a set of reference signals during a first set of multiple time occasions associated with an initial beam pairing resource, each time occasion of the first set of multiple time occasions associated with a repetition of the set of reference signals, where the initial beam pairing resource includes the first set of multiple time occasions and a second set of multiple time occasions for transmission of a response message, each time occasion of the second set of multiple time occasions corresponding to a respective reference signal of the set of reference signals. The response signal manager 940 is capable of, configured to, or operable to support a means for receiving a response message during a first time occasion of the second set of multiple time occasions to indicate a beam for sidelink communications with a second UE, where the beam is associated with a reference signal corresponding to the first time occasion.

In some examples, each reference signal of the set of reference signals is transmitted in two or less symbol periods. In some examples, the initial beam pairing resource includes a gap period between a last time occasion of the first set of multiple time occasions and a first time occasion of the second set of multiple time occasions.

In some examples, a sidelink bandwidth part is associated with a slot numbering. In some examples, the initial beam pairing resource is configured within a time period determined according to a slot offset applied to the slot numbering associated with the sidelink bandwidth part.

In some examples, a sidelink resource pool for sidelink communications includes a subset of slots of a sidelink bandwidth part. In some examples, the initial beam pairing resource is configured within a time period determined according to a slot offset within the sidelink resource pool.

In some examples, the initial beam pairing resource is excluded from the sidelink resource pool for sidelink transmissions, and the resource allocation component 945 is capable of, configured to, or operable to support a means for transmitting a message that indicates a resource allocation for a sidelink transmission based on a slot index, the slot index being based on the initial beam pairing resource being excluded from a slot numbering associated with the sidelink resource pool.

In some examples, the sidelink resource pool for sidelink transmissions includes the initial beam pairing resource, and the resource allocation component 945 is capable of, configured to, or operable to support a means for transmitting a sidelink control information message that reserves the initial beam pairing resource for a beam pairing procedure.

In some examples, the initial beam pairing resource is allocated to a first subset of a frequency bandwidth associated with a sidelink bandwidth part or a sidelink resource pool.

In some examples, each reference signal of the set of reference signals includes at least one of a secondary synchronization signal, a channel state information reference signal, a sounding reference signal, and a physical random access channel signal.

In some examples, the response message includes a secondary synchronization signal, a channel state information reference signal, a sounding reference signal, or a physical random access channel signal, the response message being received using the beam.

Figure 10:
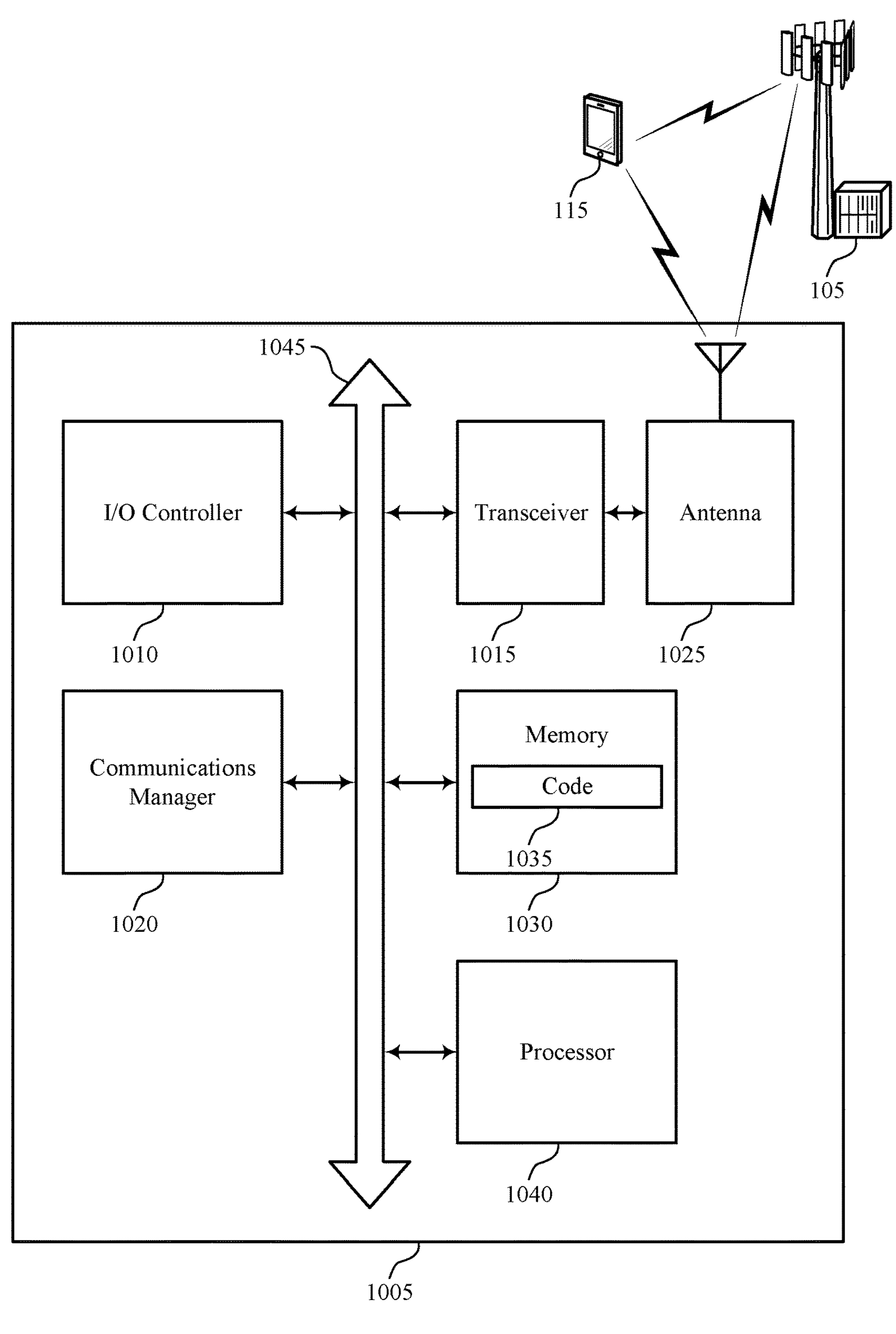
FIG. 10 shows a diagram of a system including a device that supports resource configuration for initial beam pairing for sidelink operations in accordance with one or more aspects of the present disclosure.

FIG. 10 shows a diagram of a system 1000 including a device 1005 that supports resource configuration for initial beam pairing for sidelink operations in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable code 1035 (e.g., processor-executable code) including instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may contain, among other things, a basic I/O system (BIOS) which may control basic hardware or software operation such as the interaction with peripheral components or devices.

The at least one processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting resource configuration for initial beam pairing for sidelink operations). For example, the device 1005 or a component of the device 1005 may include at least one processor 1040 and at least one memory 1030 coupled with or to the at least one processor 1040, the at least one processor 1040 and at least one memory 1030 configured to perform various functions described herein. In some examples, the at least one processor 1040 may include multiple processors and the at least one memory 1030 may include multiple memories. One or more of the multiple processors may be coupled with one or more of the multiple memories, which may, individually or collectively, be configured to perform various functions herein.

The communications manager 1020 may support wireless communication in accordance with examples as disclosed herein. For example, the communications manager 1020 is capable of, configured to, or operable to support a means for measuring a set of reference signals during a first set of multiple time occasions associated with an initial beam pairing resource, each time occasion of the first set of multiple time occasions associated with a repetition of the set of reference signals, where the initial beam pairing resource includes the first set of multiple time occasions and a second set of multiple time occasions for transmission of a response message, each time occasion of the second set of multiple time occasions corresponding to a respective reference signal of the set of reference signals. The communications manager 1020 is capable of, configured to, or operable to support a means for transmitting a response message during a first time occasion of the second set of multiple time occasions to indicate a beam for sidelink communications with a second UE, where the beam is associated with a reference signal corresponding to the first time occasion.

Additionally, or alternatively, the communications manager 1020 may support wireless communication in accordance with examples as disclosed herein. For example, the communications manager 1020 is capable of, configured to, or operable to support a means for transmitting a set of reference signals during a first set of multiple time occasions associated with an initial beam pairing resource, each time occasion of the first set of multiple time occasions associated with a repetition of the set of reference signals, where the initial beam pairing resource includes the first set of multiple time occasions and a second set of multiple time occasions for transmission of a response message, each time occasion of the second set of multiple time occasions corresponding to a respective reference signal of the set of reference signals. The communications manager 1020 is capable of, configured to, or operable to support a means for receiving a response message during a first time occasion of the second set of multiple time occasions to indicate a beam for sidelink communications with a second UE, where the beam is associated with a reference signal corresponding to the first time occasion.

By including or configuring the communications manager 1020 in accordance with examples as described herein, the device 1005 may support techniques for performing IBP procedures with reduced processing, overhead, more efficient utilization of communication resources, and more coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of resource configuration for initial beam pairing for sidelink operations as described herein, or the at least one processor 1040 and the at least one memory 1030 may be otherwise configured to, individually or collectively, perform or support such operations.

FIG. 11 shows a flowchart illustrating a method 1100 that supports resource configuration for initial beam pairing for sidelink operations in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include measuring a set of reference signals during a first set of multiple time occasions associated with an initial beam pairing resource, each time occasion of the first set of multiple time occasions associated with a repetition of the set of reference signals, where the initial beam pairing resource includes the first set of multiple time occasions and a second set of multiple time occasions for transmission of a response message, each time occasion of the second set of multiple time occasions corresponding to a respective reference signal of the set of reference signals. The operations of block 1105 may be performed in accordance with examples as disclosed herein. In some examples, aspects of the operations of 1105 may be performed by a reference signal manager 925 as described with reference to FIG. 9.

At 1110, the method may include transmitting a response message during a first time occasion of the second set of multiple time occasions to indicate a beam for sidelink communications with a second UE, where the beam is associated with a reference signal corresponding to the first time occasion. The operations of block 1110 may be performed in accordance with examples as disclosed herein. In some examples, aspects of the operations of 1110 may be performed by a response message component 930 as described with reference to FIG. 9.

FIG. 12 shows a flowchart illustrating a method 1200 that supports resource configuration for initial beam pairing for sidelink operations in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1205, the method may include receiving a message that indicates a resource allocation for a sidelink transmission based on a slot index, the slot index being based on the initial beam pairing resource being excluded from a slot numbering associated with the sidelink resource pool. The operations of block 1205 may be performed in accordance with examples as disclosed herein. In some examples, aspects of the operations of 1205 may be performed by a resource allocation component 945 as described with reference to FIG. 9.

At 1210, the method may include measuring a set of reference signals during a first set of multiple time occasions associated with an initial beam pairing resource, each time occasion of the first set of multiple time occasions associated with a repetition of the set of reference signals, where the initial beam pairing resource includes the first set of multiple time occasions and a second set of multiple time occasions for transmission of a response message, each time occasion of the second set of multiple time occasions corresponding to a respective reference signal of the set of reference signals. The operations of block 1210 may be performed in accordance with examples as disclosed herein. In some examples, aspects of the operations of 1210 may be performed by a reference signal manager 925 as described with reference to FIG. 9.

At 1215, the method may include transmitting a response message during a first time occasion of the second set of multiple time occasions to indicate a beam for sidelink communications with a second UE, where the beam is associated with a reference signal corresponding to the first time occasion. The operations of block 1215 may be performed in accordance with examples as disclosed herein. In some examples, aspects of the operations of 1215 may be performed by a response message component 930 as described with reference to FIG. 9.

FIG. 13 shows a flowchart illustrating a method 1300 that supports resource configuration for initial beam pairing for sidelink operations in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1305, the method may include transmitting a set of reference signals during a first set of multiple time occasions associated with an initial beam pairing resource, each time occasion of the first set of multiple time occasions associated with a repetition of the set of reference signals, where the initial beam pairing resource includes the first set of multiple time occasions and a second set of multiple time occasions for transmission of a response message, each time occasion of the second set of multiple time occasions corresponding to a respective reference signal of the set of reference signals. The operations of block 1305 may be performed in accordance with examples as disclosed herein. In some examples, aspects of the operations of 1305 may be performed by a reference signal component 935 as described with reference to FIG. 9.

At 1310, the method may include receiving a response message during a first time occasion of the second set of multiple time occasions to indicate a beam for sidelink communications with a second UE, where the beam is associated with a reference signal corresponding to the first time occasion. The operations of block 1310 may be performed in accordance with examples as disclosed herein. In some examples, aspects of the operations of 1310 may be performed by a response signal manager 940 as described with reference to FIG. 9.

Figure 14:
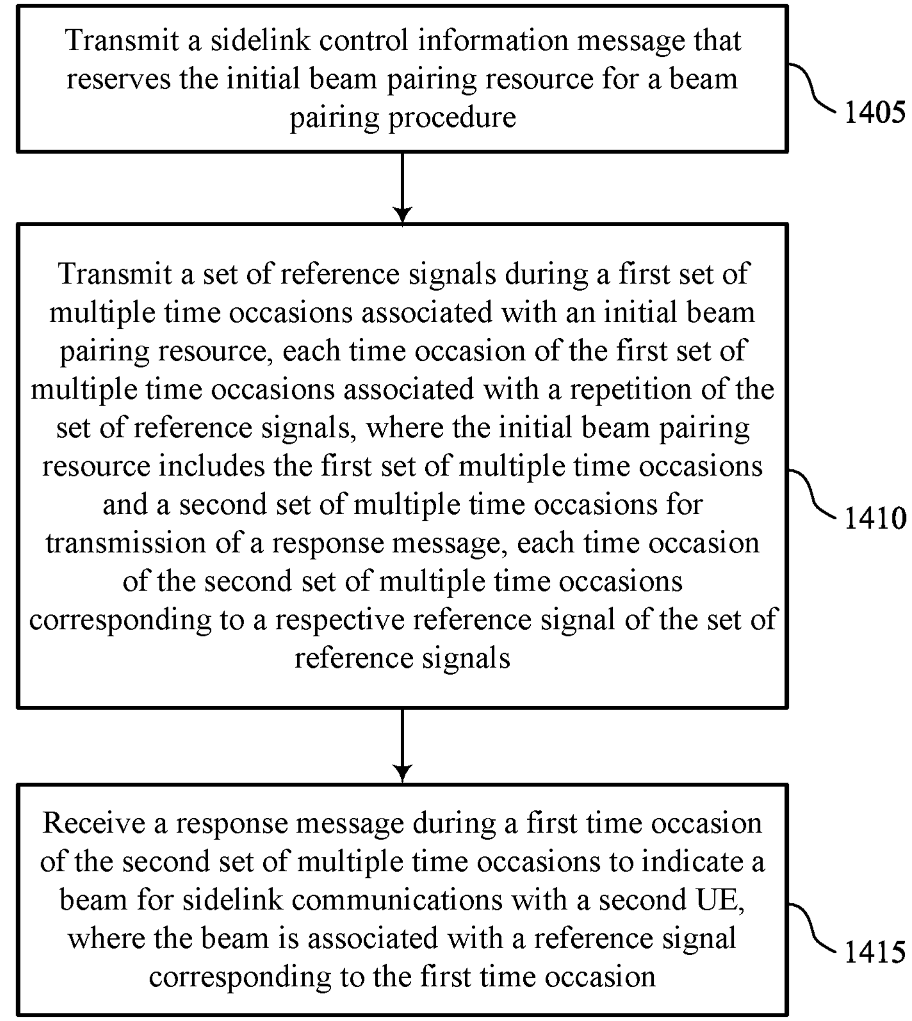

FIG. 14 shows a flowchart illustrating a method 1400 that supports resource configuration for initial beam pairing for sidelink operations in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1405, the method may include transmitting a sidelink control information message that reserves the initial beam pairing resource for a beam pairing procedure. The operations of block 1405 may be performed in accordance with examples as disclosed herein. In some examples, aspects of the operations of 1405 may be performed by a resource allocation component 945 as described with reference to FIG. 9.

At 1410, the method may include transmitting a set of reference signals during a first set of multiple time occasions associated with an initial beam pairing resource, each time occasion of the first set of multiple time occasions associated with a repetition of the set of reference signals, where the initial beam pairing resource includes the first set of multiple time occasions and a second set of multiple time occasions for transmission of a response message, each time occasion of the second set of multiple time occasions corresponding to a respective reference signal of the set of reference signals. The operations of block 1410 may be performed in accordance with examples as disclosed herein. In some examples, aspects of the operations of 1410 may be performed by a reference signal component 935 as described with reference to FIG. 9.

At 1415, the method may include receiving a response message during a first time occasion of the second set of multiple time occasions to indicate a beam for sidelink communications with a second UE, where the beam is associated with a reference signal corresponding to the first time occasion. The operations of block 1415 may be performed in accordance with examples as disclosed herein. In some examples, aspects of the operations of 1415 may be performed by a response signal manager 940 as described with reference to FIG. 9.

The following provides an overview of aspects of the present disclosure:

Aspect 1: A method for wireless communication at a first UE, comprising: measuring a set of reference signals during a first plurality of time occasions associated with an IBP resource, each time occasion of the first plurality of time occasions associated with a repetition of the set of reference signals, wherein the IBP resource comprises the first plurality of time occasions and a second plurality of time occasions for transmission of a response message, each time occasion of the second plurality of time occasions corresponding to a respective reference signal of the set of reference signals; and transmitting a response message during a first time occasion of the second plurality of time occasions to indicate a beam for sidelink communications with a second UE, wherein the beam is associated with a reference signal corresponding to the first time occasion.

Aspect 2: The method of aspect 1, wherein each reference signal of the set of reference signals is transmitted in two or less symbol periods.

Aspect 3: The method of aspect 2, wherein each reference signal of the set of reference signals is transmitted in less than two symbol periods.

Aspect 4: The method of any of aspects 1 through 3, wherein the IBP resource comprises a gap period between a last time occasion of the first plurality of time occasions and a first time occasion of the second plurality of time occasions.

Aspect 5: The method of any of aspects 1 through 4, wherein a sidelink BWP is associated with a slot numbering, and the IBP resource is configured within a time period determined according to a slot offset applied to the slot numbering associated with the sidelink BWP.

Aspect 6: The method of any of aspects 1 through 4, wherein a sidelink resource pool for sidelink communications comprises a subset of slots of a sidelink BWP, and the IBP resource is configured within a time period determined according to a slot offset within the sidelink resource pool.

Aspect 7: The method of aspect 6, wherein the IBP resource is excluded from the sidelink resource pool, the method further comprising: receiving a message that indicates a resource allocation for a sidelink transmission based at least in part on a slot index, the slot index being based at least in part on the IBP resource being excluded from a slot numbering associated with the sidelink resource pool.

Aspect 8: The method of any of aspects 6 through 7, wherein the sidelink resource pool for sidelink transmissions includes the IBP resource, the method further comprising: receiving, from the second UE, a sidelink control information message that reserves the IBP resource for a beam pairing procedure.

Aspect 9: The method of any of aspects 1 through 8, wherein the IBP resource is allocated to a first subset of a frequency bandwidth associated with a sidelink BWP or a sidelink resource pool.

Aspect 10: The method of aspect 9, wherein a second subset of the frequency bandwidth is available for sidelink communications by other UEs.

Aspect 11: The method of any of aspects 9 through 10, wherein the IBP resource is selected from a plurality of frequency division multiplexed resources.

Aspect 12: The method of aspect 11, wherein a plurality of IBP resources including the IBP resource are associated with a respective comb offset.

Aspect 13: The method of any of aspects 1 through 12, wherein the IBP resource and one or more additional beam pairing resources are partitioned in a sequence domain based at least in part on a plurality of sequence indices of a secondary synchronization signal, a sounding reference signal, or a physical random access channel signal.

Aspect 14: The method of any of aspects 1 through 13, wherein the IBP resource and one or more additional beam pairing resources are partitioned in a cyclic shift domain based at least in part on plurality of cyclic shifts of secondary synchronization signal, sounding reference signal, or physical random access channel signal.

Aspect 15: The method of any of aspects 1 through 14, wherein each reference signal of the set of reference signals comprises at least one of a secondary synchronization signal, a channel state information reference signal, a sounding reference signal, and a physical random access channel signal.

Aspect 16: The method of any of aspects 1 through 15, wherein the response message comprises at least one of a secondary synchronization signal, a channel state information reference signal, a sounding reference signal, and a physical random access channel signal, the response message being transmitted using the beam.

Aspect 17: The method of any of aspects 1 through 16, wherein the IBP resource repeats based at least in part on a first periodicity, the first periodicity being based at least in part on a periodicity of a sidelink synchronization signal block.

Aspect 18: The method of any of aspects 1 through 17, wherein the IBP resource is selected for transmission of the set of reference signals based at least in part on a mapping between service information and the IBP resource, mapping information between destination information and the IBP resource, an updated identity value for a reference signal of the set of reference signals, or a combination thereof.

Aspect 19: A method for wireless communication at a first UE, comprising: transmitting a set of reference signals during a first plurality of time occasions associated with an IBP resource, each time occasion of the first plurality of time occasions associated with a repetition of the set of reference signals, wherein the IBP resource comprises the first plurality of time occasions and a second plurality of time occasions for transmission of a response message, each time occasion of the second plurality of time occasions corresponding to a respective reference signal of the set of reference signals; and receiving a response message during a first time occasion of the second plurality of time occasions to indicate a beam for sidelink communications with a second UE, wherein the beam is associated with a reference signal corresponding to the first time occasion.

Aspect 20: The method of aspect 19, wherein each reference signal of the set of reference signals is transmitted in two or less symbol periods.

Aspect 21: The method of any of aspects 19 through 20, wherein the IBP resource comprises a gap period between a last time occasion of the first plurality of time occasions and a first time occasion of the second plurality of time occasions.

Aspect 22: The method of any of aspects 19 through 21, wherein a sidelink BWP is associated with a slot numbering, and the IBP resource is configured within a time period determined according to a slot offset applied to the slot numbering associated with the sidelink BWP.

Aspect 23: The method of any of aspects 19 through 21, wherein a sidelink resource pool for sidelink communications comprises a subset of slots of a sidelink BWP, and the IBP resource is configured within a time period determined according to a slot offset within the sidelink resource pool.

Aspect 24: The method of aspect 23, wherein the IBP resource is excluded from the sidelink resource pool for sidelink transmissions, the method further comprising: transmitting a message that indicates a resource allocation for a sidelink transmission based at least in part on a slot index, the slot index being based at least in part on the IBP resource being excluded from a slot numbering associated with the sidelink resource pool.

Aspect 25: The method of any of aspects 23 through 24, wherein the sidelink resource pool for sidelink transmissions includes the IBP resource, the method further comprising: transmitting a sidelink control information message that reserves the IBP resource for a beam pairing procedure.

Aspect 26: The method of any of aspects 19 through 25, wherein the IBP resource is allocated to a first subset of a frequency bandwidth associated with a sidelink BWP or a sidelink resource pool.

Aspect 27: The method of any of aspects 19 through 26, wherein each reference signal of the set of reference signals comprises at least one of a secondary synchronization signal, a channel state information reference signal, a sounding reference signal, and a physical random access channel signal.

Aspect 28: The method of any of aspects 19 through 27, wherein the response message comprises a secondary synchronization signal, a channel state information reference signal, a sounding reference signal, or a physical random access channel signal, the response message being received using the beam.

Aspect 29: A first UE for wireless communication, comprising one or more memories storing processor-executable code, and one or more processors coupled with the one or more memories and individually or collectively operable to execute the code to cause the first UE to perform a method of any of aspects 1 through 18.

Aspect 30: A first UE for wireless communication, comprising at least one means for performing a method of any of aspects 1 through 18.

Aspect 31: A non-transitory computer-readable medium storing code for wireless communication, the code comprising instructions executable by a processor to perform a method of any of aspects 1 through 18.

Aspect 32: A first UE for wireless communication, comprising one or more memories storing processor-executable code, and one or more processors coupled with the one or more memories and individually or collectively operable to execute the code to cause the second UE to perform a method of any of aspects 19 through 28.

Aspect 33: A first UE for wireless communication, comprising at least one means for performing a method of any of aspects 19 through 28.

Aspect 34: A non-transitory computer-readable medium storing code for wireless communication, the code comprising instructions executable by a processor to perform a method of any of aspects 19 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first user equipment (UE), comprising:

one or more memories storing processor-executable code; and one or more processors coupled with the one or more memories and individually or collectively operable to execute the code to cause the first UE to:

measure a set of reference signals during a first plurality of time occasions associated with an initial beam pairing resource, each time occasion of the first plurality of time occasions associated with a repetition of the set of reference signals, wherein the initial beam pairing resource is within a first subset of a frequency bandwidth associated with a sidelink bandwidth part or a sidelink resource pool and a second subset of the frequency bandwidth is available for sidelink communications by other UEs, and wherein the initial beam pairing resource comprises the first plurality of time occasions and a second plurality of time occasions for transmission of a response message, each time occasion of the second plurality of time occasions corresponding to a respective reference signal of the set of reference signals; and transmit a response message during a first time occasion of the second plurality of time occasions to indicate a beam for sidelink communications with a second UE, wherein the beam is associated with a reference signal corresponding to the first time occasion.

2. The first UE of claim 1, wherein each reference signal of the set of reference signals is transmitted in two or less symbol periods.

3. The first UE of claim 2, wherein each reference signal of the set of reference signals is transmitted in less than two symbol periods.

4. The first UE of claim 1, wherein the initial beam pairing resource comprises a gap period between a last time occasion of the first plurality of time occasions and a first time occasion of the second plurality of time occasions.

5. The first UE of claim 1, wherein the sidelink bandwidth part is associated with a slot numbering, and wherein the initial beam pairing resource is configured within a time period determined according to a slot offset applied to the slot numbering associated with the sidelink bandwidth part.

6. The first UE of claim 1, wherein the sidelink resource pool comprises a subset of slots of the sidelink bandwidth part, and wherein the initial beam pairing resource is configured within a time period determined according to a slot offset within the sidelink resource pool.

7. The first UE of claim 6, wherein the initial beam pairing resource is excluded from the sidelink resource pool, and the one or more processors are individually or collectively further operable to execute the code to cause the first UE to:

receive a message that indicates a resource allocation for a sidelink transmission based at least in part on a slot index, the slot index being based at least in part on the initial beam pairing resource being excluded from a slot numbering associated with the sidelink resource pool.

8. The first UE of claim 6, wherein the sidelink resource pool for sidelink transmissions includes the initial beam pairing resource, and the one or more processors are individually or collectively further operable to execute the code to cause the first UE to:

receive, from the second UE, a sidelink control information message that reserves the initial beam pairing resource for a beam pairing procedure.

9. The first UE of claim 1, wherein the initial beam pairing resource is selected from a plurality of frequency division multiplexed resources.

10. The first UE of claim 9, wherein a plurality of initial beam pairing resources including the initial beam pairing resource are associated with a respective comb offset.

11. The first UE of claim 1, wherein the initial beam pairing resource and one or more additional beam pairing resources are partitioned in a sequence domain based at least in part on a plurality of sequence indices of a secondary synchronization signal, a sounding reference signal, or a physical random access channel signal.

12. The first UE of claim 1, wherein the initial beam pairing resource and one or more additional beam pairing resources are partitioned in a cyclic shift domain based at least in part on plurality of cyclic shifts of secondary synchronization signal, sounding reference signal, or physical random access channel signal.

13. The first UE of claim 1, wherein each reference signal of the set of reference signals comprises at least one of a secondary synchronization signal, a channel state information reference signal, a sounding reference signal, and a physical random access channel signal.

14. The first UE of claim 1, wherein the response message comprises at least one of a secondary synchronization signal, a channel state information reference signal, a sounding reference signal, and a physical random access channel signal, the response message being transmitted using the beam.

15. The first UE of claim 1, wherein the initial beam pairing resource repeats based at least in part on a first periodicity, the first periodicity being based at least in part on a periodicity of a sidelink synchronization signal block.

16. The first UE of claim 1, wherein the initial beam pairing resource is selected for transmission of the set of reference signals based at least in part on a mapping between service information and the initial beam pairing resource, mapping information between destination information and the initial beam pairing resource, an updated identity value for a reference signal of the set of reference signals, or a combination thereof.

17. A first user equipment (UE), comprising:

one or more memories storing processor-executable code; and one or more processors coupled with the one or more memories and individually or collectively operable to execute the code to cause the first UE to:

transmit a set of reference signals during a first plurality of time occasions associated with an initial beam pairing resource, each time occasion of the first plurality of time occasions associated with a repetition of the set of reference signals, wherein the initial beam pairing resource is within a first subset of a frequency bandwidth associated with a sidelink bandwidth part or a sidelink resource pool and a second subset of the frequency bandwidth is available for sidelink communications by other UEs, and wherein the initial beam pairing resource comprises the first plurality of time occasions and a second plurality of time occasions for transmission of a response message, each time occasion of the second plurality of time occasions corresponding to a respective reference signal of the set of reference signals; and receive a response message during a first time occasion of the second plurality of time occasions to indicate a beam for sidelink communications with a second UE, wherein the beam is associated with a reference signal corresponding to the first time occasion.

18. The first UE of claim 17, wherein each reference signal of the set of reference signals is transmitted in two or less symbol periods.

19. The first UE of claim 17, wherein the initial beam pairing resource comprises a gap period between a last time occasion of the first plurality of time occasions and a first time occasion of the second plurality of time occasions.

20. The first UE of claim 17, wherein the sidelink bandwidth part is associated with a slot numbering, and wherein the initial beam pairing resource is configured within a time period determined according to a slot offset applied to the slot numbering associated with the sidelink bandwidth part.

21. The first UE of claim 17, wherein the sidelink resource pool comprises a subset of slots of the sidelink bandwidth part, and wherein the initial beam pairing resource is configured within a time period determined according to a slot offset within the sidelink resource pool.

22. The first UE of claim 21, wherein the initial beam pairing resource is excluded from the sidelink resource pool for sidelink transmissions, and the one or more processors are individually or collectively further operable to execute the code to cause the first UE to:

transmit a message that indicates a resource allocation for a sidelink transmission based at least in part on a slot index, the slot index being based at least in part on the initial beam pairing resource being excluded from a slot numbering associated with the sidelink resource pool.

23. The first UE of claim 21, wherein the sidelink resource pool for sidelink transmissions includes the initial beam pairing resource, and the one or more processors are individually or collectively further operable to execute the code to cause the first UE to:

transmit a sidelink control information message that reserves the initial beam pairing resource for a beam pairing procedure.

24. The first UE of claim 17, wherein each reference signal of the set of reference signals comprises at least one of a secondary synchronization signal, a channel state information reference signal, a sounding reference signal, and a physical random access channel signal.

25. The first UE of claim 17, wherein the response message comprises a secondary synchronization signal, a channel state information reference signal, a sounding reference signal, or a physical random access channel signal, the response message being received using the beam.

26. A method for wireless communication at a first user equipment (UE), comprising:

measuring a set of reference signals during a first plurality of time occasions associated with an initial beam pairing resource, each time occasion of the first plurality of time occasions associated with a repetition of the set of reference signals, wherein the initial beam pairing resource is within a first subset of a frequency bandwidth associated with a sidelink bandwidth part or a sidelink resource pool and a second subset of the frequency bandwidth is available for sidelink communications by other UEs, and wherein the initial beam pairing resource comprises the first plurality of time occasions and a second plurality of time occasions for transmission of a response message, each time occasion of the second plurality of time occasions corresponding to a respective reference signal of the set of reference signals; and transmitting a response message during a first time occasion of the second plurality of time occasions to indicate a beam for sidelink communications with a second UE, wherein the beam is associated with a reference signal corresponding to the first time occasion.

27. The method of claim 26, wherein each reference signal of the set of reference signals is transmitted in two or less symbol periods.

28. The method of claim 26, wherein the initial beam pairing resource comprises a gap period between a last time occasion of the first plurality of time occasions and a first time occasion of the second plurality of time occasions.

29. A method for wireless communication at a first user equipment (UE), comprising:

transmitting a set of reference signals during a first plurality of time occasions associated with an initial beam pairing resource, each time occasion of the first plurality of time occasions associated with a repetition of the set of reference signals, wherein the initial beam pairing resource is within a first subset of a frequency bandwidth associated with a sidelink bandwidth part or a sidelink resource pool and a second subset of the frequency bandwidth is available for sidelink communications by other UEs, and wherein the initial beam pairing resource comprises the first plurality of time occasions and a second plurality of time occasions for transmission of a response message, each time occasion of the second plurality of time occasions corresponding to a respective reference signal of the set of reference signals; and receiving a response message during a first time occasion of the second plurality of time occasions to indicate a beam for sidelink communications with a second UE, wherein the beam is associated with a reference signal corresponding to the first time occasion.

30. The method of claim 29, wherein each reference signal of the set of reference signals is transmitted in two or less symbol periods.

* * * * *